(12) United States Patent
Teller et al.

(10) Patent No.: US 9,791,957 B2
(45) Date of Patent: Oct. 17, 2017

(54) DYNAMIC INPUT AT A TOUCH-BASED INTERFACE BASED ON PRESSURE

(71) Applicant: X Development LLC, Mountain View, CA (US)

(72) Inventors: Eric Teller, San Francisco, CA (US); Claes-Fredrik Mannby, Mercer Island, WA (US); Martin T. King, Vashon Island, WA (US); Kevin Anthony Furr, Vashon, WA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/705,701

(22) Filed: May 6, 2015

(65) Prior Publication Data
US 2015/0234518 A1    Aug. 20, 2015

Related U.S. Application Data

(62) Division of application No. 13/156,182, filed on Jun. 8, 2011, now Pat. No. 9,046,999.

(60) Provisional application No. 61/352,784, filed on Jun. 8, 2010, provisional application No. 61/352,730, filed on Jun. 8, 2010, provisional application No. 61/352,721, filed on Jun. 8, 2010, provisional application No. 61/352,787, filed on Jun. 8, 2010, provisional application No. 61/352,783, filed on Jun. 8, 2010.

(51) Int. Cl.
*G06F 3/041* (2006.01)
*G06F 3/0354* (2013.01)

(52) U.S. Cl.
CPC ........ *G06F 3/0414* (2013.01); *G06F 3/03545* (2013.01)

(58) Field of Classification Search
CPC ........................... G06F 3/0414; G06F 3/03545
See application file for complete search history.

(56) References Cited

U.S. PATENT DOCUMENTS

| | | | |
|---|---|---|---|
| 2004/0113867 A1* | 6/2004 | Tomine | G02B 27/0172 345/8 |
| 2005/0206583 A1 | 9/2005 | Lemelson et al. | |
| 2006/0132456 A1* | 6/2006 | Anson | G06F 3/0488 345/173 |
| 2006/0284858 A1 | 12/2006 | Rekimoto | |
| 2007/0176903 A1* | 8/2007 | Dahlin | G06F 3/03547 345/169 |
| 2007/0229455 A1 | 10/2007 | Martin et al. | |
| 2009/0046110 A1* | 2/2009 | Sadler | G06F 3/0488 345/660 |

(Continued)

*Primary Examiner* — Aneeta Yodichkas
(74) *Attorney, Agent, or Firm* — McDonnell Boehnen Hulbert & Berghoff LLP

(57) ABSTRACT

Disclosed herein are methods, devices, and systems that may enable a touch-based interface to receive dynamic user inputs based on pressure. An exemplary method may involve: (a) detecting a touch interaction including an increase in pressure greater than a first threshold pressure-increase followed by a reduction in pressure greater than a threshold pressure-reduction; and (b) responsive to detecting the touch interaction, initiating an operation based on a region of the touch-based interface that corresponds to the touch interaction, wherein the operation is associated with the touch interaction.

13 Claims, 21 Drawing Sheets

(56) References Cited

U.S. PATENT DOCUMENTS

2009/0251661 A1* 10/2009 Fuziak, Jr. ......... G02B 27/0172
351/158

* cited by examiner

DYNAMIC INPUT AT A TOUCH-BASED INTERFACE BASED ON PRESSURE

RELATED APPLICATIONS

This application is a divisional of co-pending U.S. patent application Ser. No. 13/156,182, entitled "Dynamic Input at a Touch-Based Interface Based on Pressure," filed Jun. 8, 2011, which claims priority to U.S. Provisional Application No. 61/352,784, entitled "VISUAL PEN TRACKING", filed Jun. 8, 2010; U.S. Provisional Application No. 61/352,730, entitled "IONIC BALLPOINT PEN", filed Jun. 8, 2010; U.S. Provisional Application No. 61/352,721, entitled "P9", filed Jun. 8, 2010; U.S. Provisional Application No. 61/352,787, entitled "MOBILE DEVICE CAMERA POSITIONING", filed Jun. 8, 2010; and U.S. Provisional Application No. 61/352,783, entitled "AUDITORY PEN TRACKING", each of which is herein incorporated by reference for all purposes.

BACKGROUND

Unless otherwise indicated herein, the materials described in this section are not prior art to the claims in this application and are not admitted to be prior art by inclusion in this section.

Writing in "longhand" can be quite cumbersome, and has not advanced much in the last millennia. Text input on computing devices, such as the T9 system for cell phones, can greatly speed up text input by use of statistical knowledge of text, and explicit shortcuts, such as assigning abbreviations to represent longer phrases.

With the use of electronics, it has become possible to analyze pen movements, and to output images on surfaces such as paper. Some systems, such as pens with mechanical, optical or electrical motion tracking systems, are able to accurately track relative motion against a surface, such as a paper, but may less accurately track absolute position and motion, especially when such pens are not in contact with the surface. Some systems, such as pens with mechanical, optical or electrical motion tracking systems, are able to accurately track relative motion against a surface, such as a paper, but may less accurately track absolute position and motion, especially when such pens are not in contact with the surface.

Use of pens and pencils to take textual and graphical notes is very convenient and ubiquitous. Paper is available in many situations, such as homes, offices, restaurants, service desks, etc. However, it has historically been very inconvenient to transfer such notes into a digital form, usable by a computing system. Cameras in laptops and cellphones are often used to capture images of users and surrounding objects, but usually not a surface that a user is interacting with, such as a keyboard or a paper.

In general, computing systems such as personal computers, laptop computers, tablet computers, and cellular phones, among many other types of Internet-capable computing systems, are increasingly prevalent in numerous aspects of modern life. As computing systems become progressively more integrated with users' everyday life, the convenience, efficiency, and intuitiveness of the manner in which users interact with the computing systems becomes progressively more important.

Some recent attempts to improve the manner in which users interface with computing systems have involved use of a touch-based interface, perhaps in combination with one or more of the devices described above. While such touch-based interfaces are becoming increasingly prevalent, to date, techniques for interacting with such touch-based interfaces are often considered inconvenient, inefficient, and/or non-intuitive by users. An improvement is therefore desired.

SUMMARY

The methods, devices, and systems described herein may enable a touch-based interface to receive dynamic user inputs based on pressure. That is, a user may input various data at a touch-based interface by varying the pressure applied at a point of contact with the touch-based interface.

In one aspect, an example system may include a non-transitory computer-readable medium and program instructions stored on the non-transitory computer-readable medium and executable by a processor to: (a) receive an input signal corresponding to one or more touch interactions on a touch-based interface; (b) determine a pressure level of a given touch interaction at a given time; (c) detect a first touch interaction including a reduction in pressure level from within a first pressure range to within a second pressure range; (d) responsive to detecting the first touch interaction, initiate a first operation based on a region of the touch-based interface that corresponds to the first touch interaction; (e) detect a second touch interaction including an increase in pressure from within a third pressure range within a fourth pressure range, followed by a reduction in pressure from within the fourth pressure range to within a fifth pressure range below the third pressure range; and (f) responsive to detecting the second touch interaction, initiate a second operation based on a region of the touch-based interface that corresponds to the second touch interaction.

In another aspect, an example system may include a non-transitory computer-readable medium and program instructions stored on the non-transitory computer-readable medium and executable by a processor to: (a) receive an input signal corresponding to one or more touch interactions on a touch-based interface; (b) determine a pressure level of a given touch interaction at a given time; (c) detect a first touch interaction including a reduction in pressure level greater than a first threshold pressure-reduction; (d) responsive to detecting the first touch interaction, initiate a first operation based on a region of the touch-based interface that corresponds to the first touch interaction; (e) detect a second touch interaction including an increase in pressure level greater than a first threshold pressure-increase followed by a reduction in pressure level greater than a second threshold pressure-reduction; and (f) responsive to detecting the second touch interaction, initiate a second operation based on a region of the touch-based interface that corresponds to the second touch interaction.

In another aspect, an example computer-implemented method may involve: (a) detecting a first touch interaction on a touch-based interface, wherein the first touch interaction comprises a tap interaction comprising a reduction in pressure from a first pressure range to a second pressure range; (b) responsive to detecting the first touch interaction, initiating a first operation based on a region of the touch-based interface that corresponds to the first touch interaction; (c) detecting a second touch interaction including an increase in pressure from within a third pressure range within a fourth pressure range, followed by a reduction in pressure from within the fourth pressure range to within a fifth pressure range below the third pressure range; and (d) responsive to detecting the second touch interaction, initiating a second operation based on a region of the touch-based interface that corresponds to the second touch interaction.

In another aspect, an example computer-implemented method may involve: (a) detecting a touch interaction including an increase in pressure greater than a first threshold pressure-increase followed by a reduction in pressure greater than a threshold pressure-reduction; and responsive to detecting the touch interaction, initiating an operation based on a region of the touch-based interface that corresponds to the touch interaction, wherein the operation is associated with the touch interaction.

In another aspect, an example computer-implemented method may involve: (a) detecting a first touch interaction comprising contact with a given region of the touch-based interface for a given period of time; (b) determining whether or not the given period of time is less than a threshold period of time; (c) if the given period of time is less than the threshold period of time, then initiating a first operation based on the region of the touch-based interface that is contacted; and (d) if the given period of time is greater than the threshold period of time, then initiating a second operation based on the region of the touch-based interface that is contacted.

These as well as other aspects, advantages, and alternatives, will become apparent to those of ordinary skill in the art by reading the following detailed description, with reference where appropriate to the accompanying drawings.

DETAILED DESCRIPTION

Figure 1:
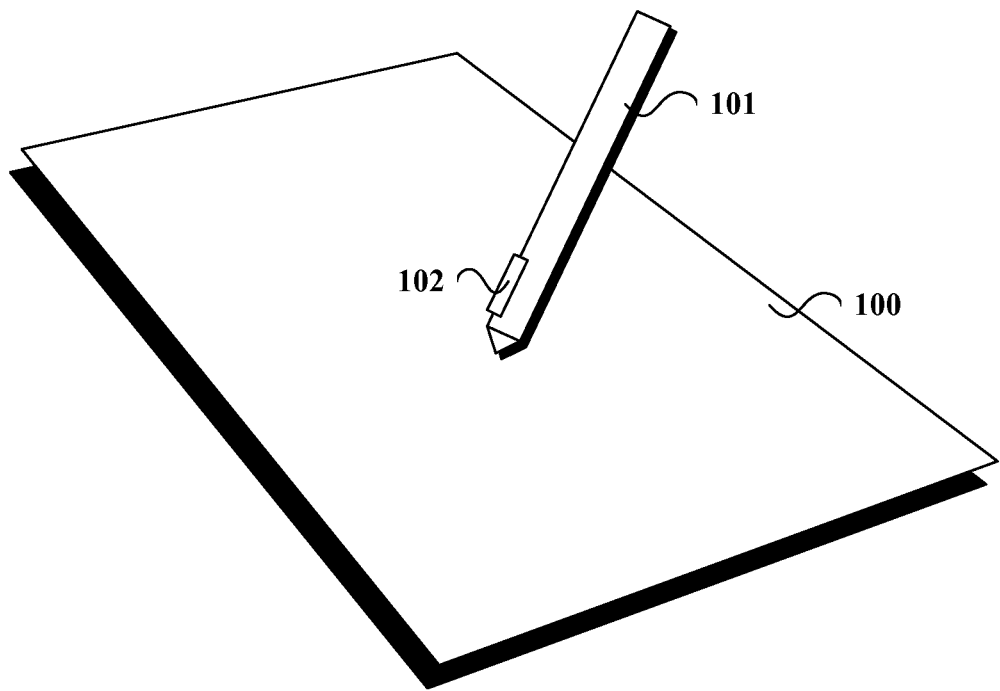
FIG. 1 shows an example input pen and surface.

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Exemplary methods and systems are described herein. It should be understood that the word "exemplary" is used herein to mean "serving as an example, instance, or illustration." Any embodiment or feature described herein as "exemplary" is not necessarily to be construed as preferred or advantageous over other embodiments or features. The exemplary embodiments described herein are not meant to be limiting.

1. Example Pen-Input Device and Methods

A system and method for using abbreviated and/or predicted gestures, especially pen gestures, to output fuller information, such as text and graphics, are described. In some embodiments, a pen capable of detection of absolute or relative positions and motion is used to input gestures, and the system interprets abbreviated and/or partial inputs, and outputs more accurate and/or extensive outputs automatically, e.g. using a laser on a light-sensitive surface.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

In this description, "pen" may refer to any device that could be used by a human being to make gestures or markings, such as a finger, a stick, a marker, a pencil, a pen, cell phone, a nose, a tongue, a toe, etc.

In some embodiments, a pen capable of detection of absolute or relative positions and motion is used to input gestures, and the system interprets abbreviated and/or partial inputs, and outputs more accurate and/or extensive outputs automatically, e.g. using a laser on a light-sensitive surface.

In some embodiments, a pen with an image sensor is used.

In some embodiments, a pen that senses relative motion through ionized ink is used.

In some embodiments, a pen is used in combination with an external device that tracks absolute and/or relative pen motion.

In some embodiments, the output is projected temporarily onto a surface or shown temporarily on a display.

In some embodiments, a pen renders markings on a special surface, while ink from the pen does not.

In some embodiments, physical pen markings and system-generated outputs are combined.

In some embodiments, system-generated outputs are not shown on the surface being written or drawn on with the pen.

In some embodiments, candidate completions or suggested outputs are displayed in a temporary form, on the surface, on a separate display, on the pen, are spoken, etc., and the user may choose to accept a choice, may accept the top choice, may passively allow the top choice to be used, may reject any output, may directly select outputs without gesture input, etc.

In some embodiments, permanent markings are made using then pen.

In some embodiments, permanent markings are made using a separate device, such as a cell phone, or using a special-purpose device, such as a plotter.

In some embodiments, the output is stored as data in a digital computing system.

As described herein, an exemplary system may include a pen capable of detection of absolute or relative positions and motion is used to input gestures, and the system interprets abbreviated and/or partial inputs, and outputs more accurate and/or extensive outputs automatically, e.g. using a laser on a light-sensitive surface.

Referring to FIG. 1, in some embodiments, a pen 101, is used to capture gestures against a UV-sensitive surface 100. Based on these gestures, a laser 102 etches words, graphics and images onto UV-sensitive surface 100.

Figure 2:
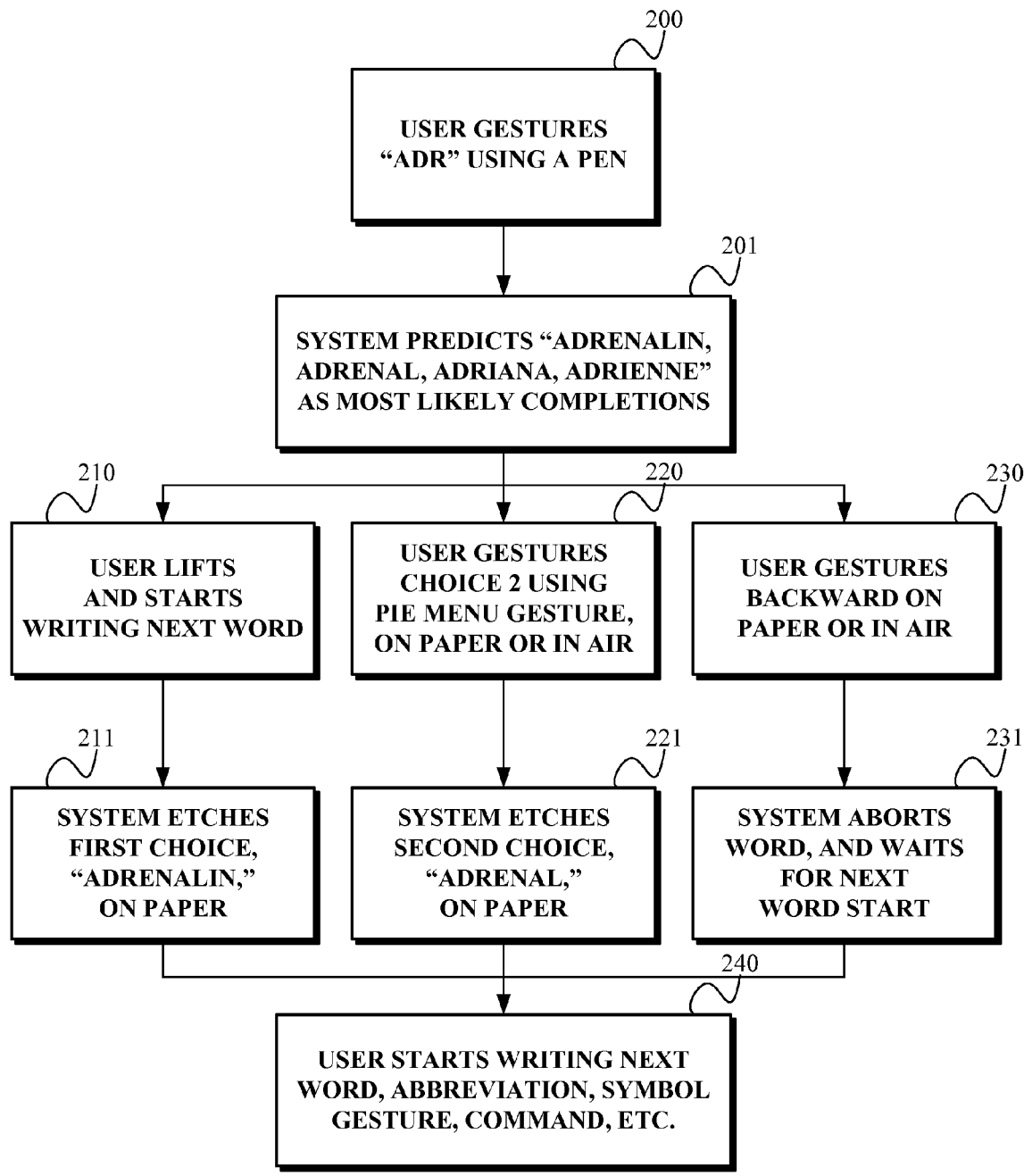
FIG. 2 shows an example pen-input method.

Referring to FIG. 2, in some embodiments, a user may use a pen to gesture letters "adr" in step 200, and the system may predict "adrenalin, adrenal, adriana, and adrienne" as the 4 most likely word completions and project these in-situ on the paper. The user may then, for example, lift the pen and move it forward slightly, indicating to the system that (s)he is ready to write the next word in step 210, and the system may etch the full first choice word, "adrenalin," on the paper in step 211. As another example, the user may use a gesture, on paper or in the air, selecting the second choice, e.g. using a gesture into a quadrant of a "pie menu," e.g. displayed on the paper, in step 220, and the system may etch the etch the full second choice word, "adrenal," on the paper in step 221. As another example, the user may gesture backward on the paper or in the air in step 230, and the system may abort the current word, and wait for the start of a new word, in step 231. In step 240, the system is ready for the next input.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above description using the singular or plural number may also include the plural or singular number respectively. The word "or," in reference to a list of two or more items, covers all of the following interpretations of the word: any of the items in the list, all of the items in the list, and any combination of the items in the list.

The above detailed description of an exemplary pen-based input system is not intended to be exhaustive or to limit the system to the precise form disclosed above. While specific examples of, and examples for, the system are described above for illustrative purposes, various equivalent modifications are possible within the scope of the system, as those skilled in the relevant art will recognize. For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges. Those skilled in the art will also appreciate that the actual implementation of a database may take a variety of forms, and the term "database" is used herein in the generic sense to refer to any data structure that allows data to be stored and accessed, such as tables, linked lists, arrays, etc.

2. Example Pen-Tracking Methods and Systems a. Ionic Ballpoint Pen Tracking

A system and method for tracking motion of a pen are described. In some embodiments, a ball-point or roller-ball pen is used, together with ionized ink, and electrodes, to detect the relative motion of the pen against a surface, such as a paper surface. In some embodiments, additional sensors, such as accelerometers, are used to track relative motion when the pen is not moving against the surface.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a ball-point or roller-ball pen is used, together with ionized ink, and electrodes, to detect the relative motion of the pen against a surface, such as a paper surface. In some embodiments, additional sensors, such as accelerometers, are used to track relative motion when the pen is not moving against the surface.

In some embodiments, motion of the pen against a surface is measured by measuring the electrical charge passing over 3 equally spaced electrodes around a ball in the tip of the pen. The direction and amount of motion is calculated based on the amount of charge passing through each electrode. The electrode with the most charge will, in general, be closest to the direction of motion, and the amount of motion will, in general, be correlated with the amount of ink flowing past the electrodes.

In some embodiments, an accelerometer is used to track relative motion when the pen is not tracking motion against a surface.

In some embodiments, the pen has additional electronic features, such as pressure sensors, buttons, microphones, speakers, cameras, etc.

In some embodiments, the motion and other data are recorded in computer memory in the pen.

In some embodiments, the motion and other data are processed in the pen.

In some embodiments, the motion and other data, as well as analyzed data, are stored, transmitted, streamed, compressed, etc. on the pen.

In some embodiments, the pen has a wireless and/or wired communication channel, e.g. to transmit or stream data to other digital devices, such as cell phones, storage units, computers, networks, etc.

In some embodiments, the pen has a digital display.

In some embodiments, the pen uses audio input, allowing the user to record audio, give voice commands, and provide additional information, such as voice rendering of the written and/or drawn information.

In some embodiments, the pen has a projector that can project images, e.g. onto a surface such as paper.

In some embodiments, the pen has a laser, that can, for example, etch lines, dots, and other images onto special surfaces that are photosensitive, such as UV-sensitive paper.

In some embodiments, invisible (or no) ink is used, such that a surface does not receive significant markings from the pen.

In some embodiments, image data collected by the pen is used to track absolute and/or relative motion against the surface.

In some embodiments, external devices, such as a cell phone, or a special-purpose device, may be used to track relative and/or absolute pen motion, and/or to display output from the pen, and/or to correlate data with the pen, to track relative and/or absolute motion.

As described herein, the system may include a ball-point or roller-ball pen used, together with ionized ink, and electrodes, to detect the relative motion of the pen against a surface, such as a paper surface. In some embodiments, additional sensors, such as accelerometers, are used to track relative motion when the pen is not moving against the surface.

Figure 3:
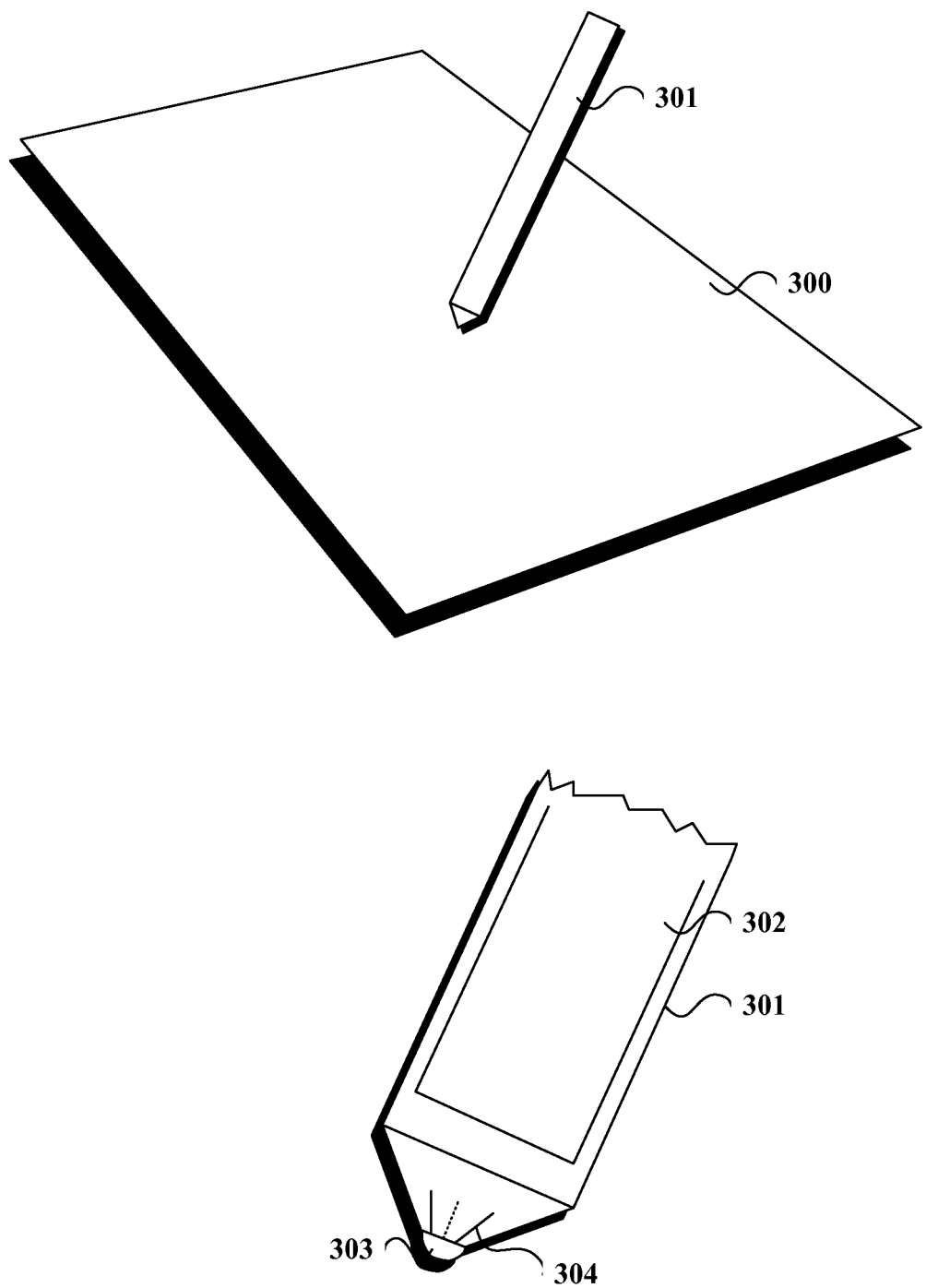
FIG. 3 shows an example ballpoint pen and surface.

Referring to FIG. 3, in some embodiments, a pen 301 is used to write on a surface 300, such as paper. The pen 301 contains ionized ink 302 that flows onto the surface by the rolling action of a ball 303 at the tip of the pen. As the ink flows out of the pen 301 close to electrodes 304, current is generated in the electrodes. Depending on the direction of motion of the pen and the ball, different amounts of current are generated in the electrodes, which can be used to calculate the direction and amount of motion.

Figure 4:
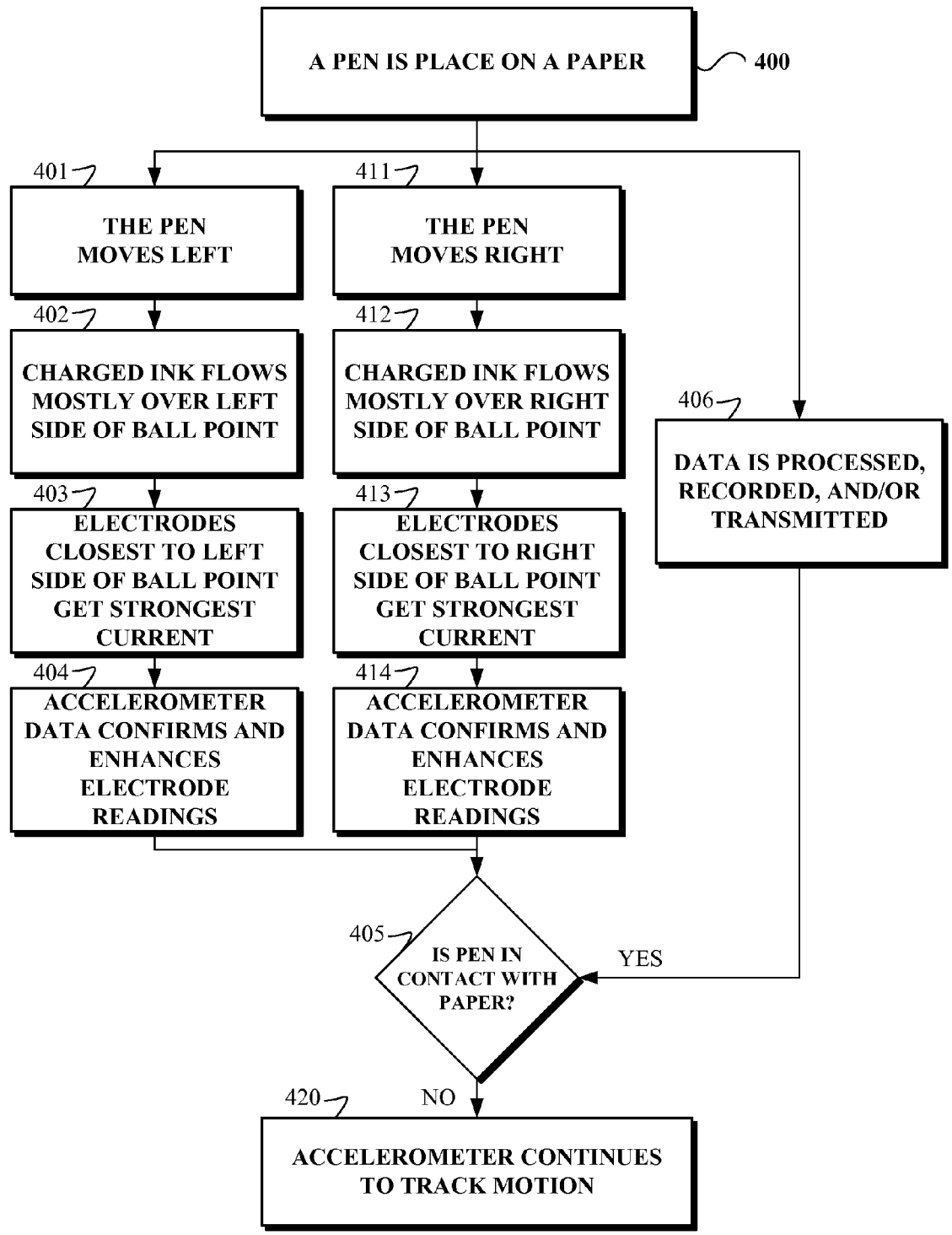
FIG. 4 shows an example ballpoint pen-tracking method.

Referring to FIG. 4, in some embodiments, a pen is placed on a surface such as paper in step 400, and depending on the direction of motion relative to the surface, e.g. left in step 401, or right, in step 411, or any other direction, charged ink flows mostly around a ball in the tip of the pen in the direction of motion, in steps 402 and 412. Electrodes, such as 3 equally spaced electrodes, receive charge based on the amount of ink flowing around the ball, which is largely based on the direction and amount of motion of the pen against the surface, in steps 403 and 413. Additional sensors, such as an accelerometer, may be used in steps 404 and 414 to confirm and enhance the electrode readings. While the pen is moving across the surface, this may continue, and data based on the various sensors may be processed, recorded and/or transmitted in step 406. When the pen is not moving against the surface, other sensors, such as accelerometers may be used in step 420 to track pen motion.

b. Auditory Pen Tracking

A system and method for using sound waves, especially surface audio waves, to track the location of objects are described. In some embodiments, a cell phone with one or more microphones is used to supplement the positioning information of a relative-motion-sensing pen with information about distance from a reference point, or locations in 2- or 3-dimensional space.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a device such as a cell phone with one or more microphones is used to supplement the positioning information of a relative-motion-sensing pen with information about distance from a reference point, or locations in 2- or 3-dimensional space.

In some embodiments, the object being tracked using sound waves does not have its own position- or motion-tracking capabilities.

In some embodiments, a single microphone is used, and only distance from the microphone is estimated.

In some embodiments, two microphones are used, and distance from the device, such as a cell phone, is estimated. In some examples, the system also identifies two possible source regions for the sound waves.

In some examples, the system assigns probabilities two each of the two possible regions based on historical data and/or in conjunction with the tracked object, and/or in conjunction with data from the tracked object.

In some embodiments, a cell phone works in conjunction with the pen device to track pen motion, e.g. using Bluetooth, infrared (IR), radio frequency (RF), Zig8ee, WiFi, etc. signals.

In some embodiments, the cell phone also serves as a user interface for the pen device.

As described herein, the system may include a cell phone with one or more microphones used to supplement the positioning information of a relative-motion-sensing pen with information about distance from a reference point, or locations in 2- or 3-dimensional space.

Figure 5:
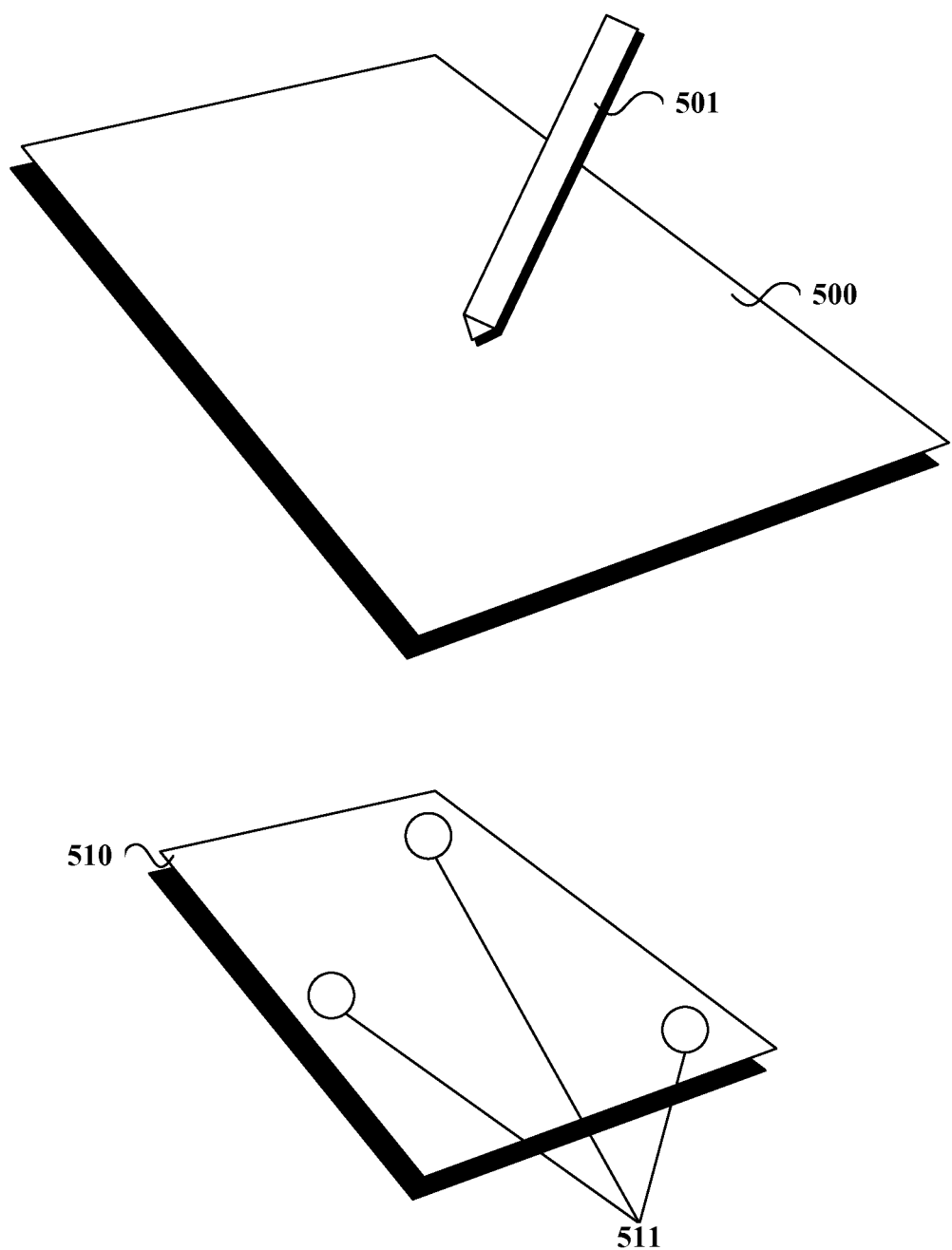
FIG. 5 shows an example input pen and surface.

Referring to FIG. 5, in some embodiments, a pen 501, is used to capture gestures against a surface 500. A cell phone 510, with 3 microphones 511 captures sound waves, especially surface audio waves (SAW) from the pen gestures, and estimates the pen's location by triangulating the 3 estimated distances calculated from the SAWs.

As described herein, the system may include a cell phone with one or more microphones used to supplement the positioning information of a relative-motion-sensing pen with information about distance from a reference point, or locations in 2- or 3-dimensional space.

Figure 6:
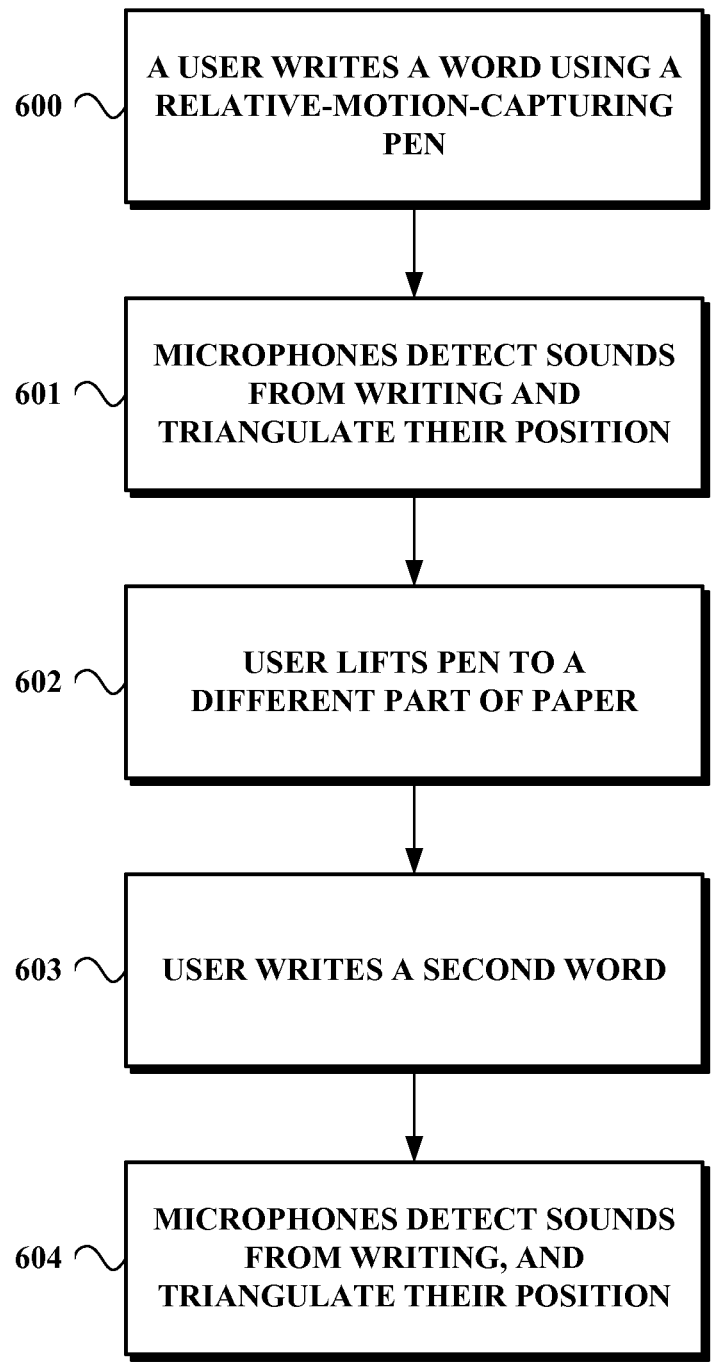
FIG. 6 shows an example auditory pen-tracking method.

Referring to FIG. 6, in some embodiments, a user may write a word using a relative-motion-capturing pen in step 600. Microphones in a cell phone detect surface audio waves from the writing, and triangulate the position of individual sounds, and average positions of sequences of sounds in step 601. In step 602, the user lifts the pen to a different part of the paper, e.g. to write the next word to the right, or to write a signature at the bottom of the page. In step 603, the user writes a second word, and in step 604 the system triangulates the position of the second word and/or parts of the second word using the surface audio waves generated by the writing of the second word.

c. Visual Pen Tracking

A system and method for using image sensors to track the location of objects are described. In some embodiments, a cell phone with one or more image sensors is used to supplement the positioning information of a relative-motion-sensing pen with information about distance from a reference point, or locations in 2- or 3-dimensional space.

The following description provides specific details for a thorough understanding of, and enabling description for, various examples of the technology. One skilled in the art will understand that the technology may be practiced without many of these details. In some instances, well known structures and function have not been shown or described in detail to avoid unnecessarily obscuring the description of the embodiments of the technology. It is intended that the terminology used in the description presented below be interpreted in its broadest reasonable manner, even though it is being used in conjunction with the detailed description of certain embodiments of the technology. Although certain terms may be emphasized below, any terminology intended to be interpreted in any restricted manner will be overtly and specifically defined as such in this detailed description section.

Although not required, aspects of the system are described as computer-executable instructions, such as routines executed by a general-purpose data processing device, e.g., a server computer, wireless device, mobile phone or personal computer. Those skilled in the relevant art will appreciate that aspects of the system can be practiced with other communications, data processing, or computer system configurations, including: Internet appliances, hand-held devices (including personal digital assistants (PDAs)), all manner of cellular or mobile phones, telecommunications or mobile devices, multi-processor systems, microprocessor-based or programmable consumer electronics, set-top boxes, network pes, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that includes components specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable storage media, including magnetically or optically readable computer discs, hard-wired or preprogrammed chips (e.g., EEPROM semiconductor chips), secure memory (such as 81M cards), nanotechnology memory, biological memory, or other data-storage media. Alternatively, computer implemented instructions, data structures, screen displays, and other data under aspects of the system may be distributed over the Internet or over other networks (including wireless networks), or they may be provided on any analog or digital network (packet switched, circuit switched, or other scheme).

In some embodiments, a device such as a cell phone with one or more image sensors is used to supplement the positioning information of a relative-motion-sensing pen with information about distance from a reference point, or locations in 2- or 3-dimensional space. In some embodiments, the object being tracked using images does not have its own position- or motion-tracking capabilities.

In some embodiments, the object being tracked is a simple stick or a finger.

In some embodiments, a single image sensor is used.

In some embodiments, two or more image sensors are used.

In some embodiments, a cell phone works in conjunction with the pen device to track pen motion, e.g. using Bluetooth, infrared (IR), radio frequency (RF), ZigBee, WiFi, etc. signals.

In some embodiments, the cell phone also serves as a user interface for the pen device.

In some embodiments, image sensors receive infrared light and/or visible light. In some examples, infrared light is used to distinguish a pen from a hand.

As described herein, the system may include a cell phone with one or more image sensors is used to supplement the positioning information of a relative-motion-sensing pen with information about distance from a reference point, or locations in 2- or 3-dimensional space.

Figure 7:
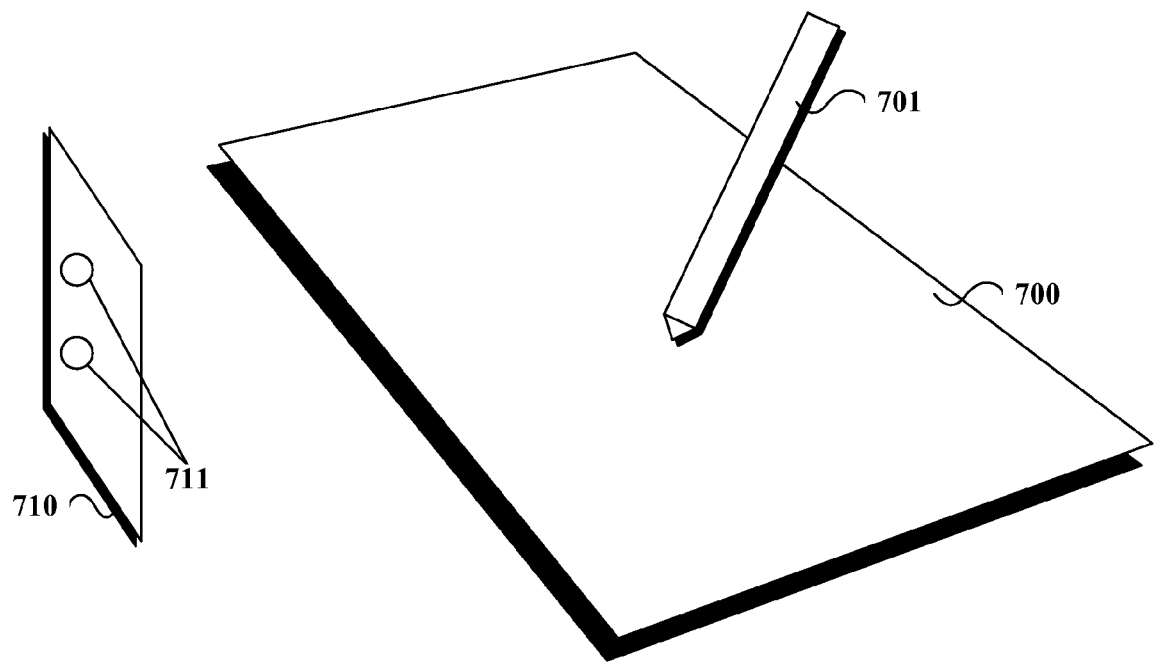
FIG. 7 shows an example input pen and surface.

Referring to FIG. 7, in some embodiments, a pen 701, is used to capture gestures against a surface 700. A cell phone 710, with 2 image sensors 711 capture images of the pen gestures, and estimates the pen's location by, for example, identifying the relative position of the surface such as a paper to the image sensors, and calculating distances from edges and other reference locations, as well as using stereoscopy to determine distance to reference points.

As described herein, the system may include a cell phone with one or more image sensors is used to supplement the positioning information of a relative-motion-sensing pen with information about distance from a reference point, or locations in 2- or 3-dimensional space.

Figure 8:
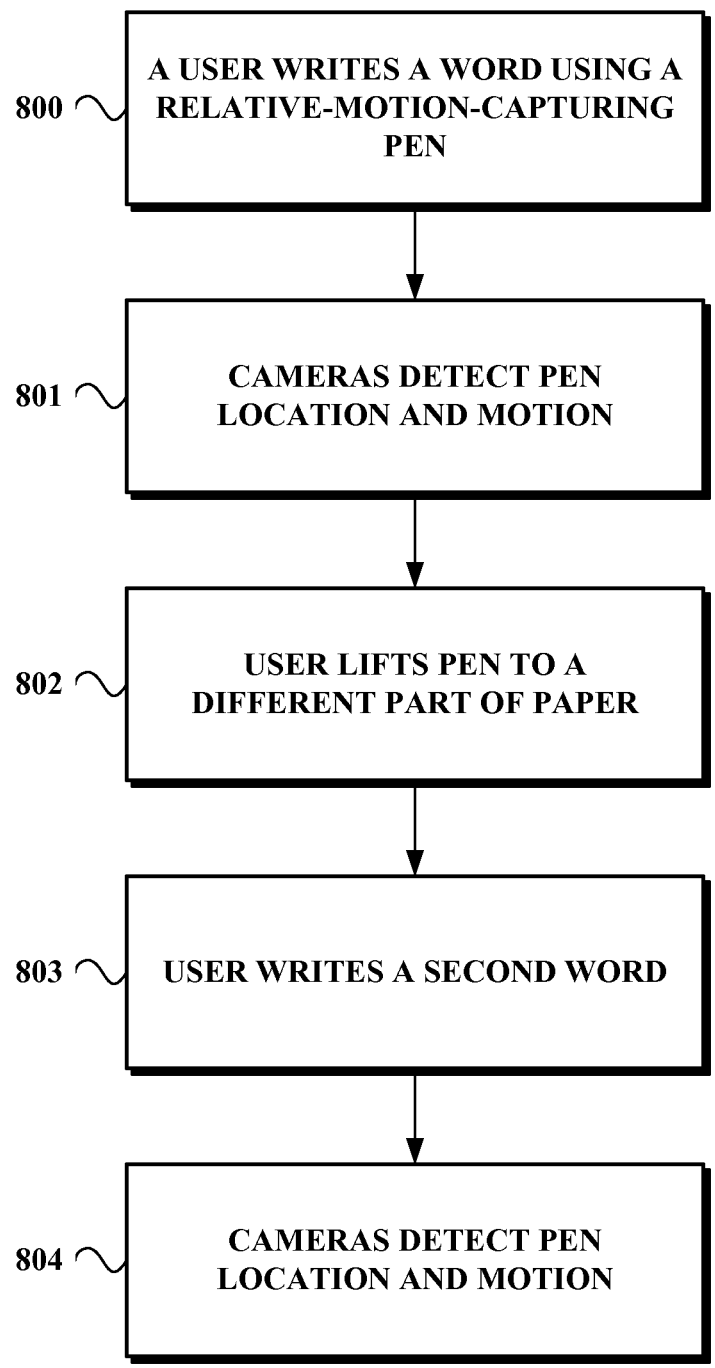
FIG. 8 shows an example visual pen-tracking method.

Referring to FIG. 8, in some embodiments, a user may write a word using a relative-motion-capturing pen in step 800. Cameras detect pen location and motion, and average pen locations in step 801. In step 802, the user lifts the pen to a different part of the paper, e.g. to write the next word to the right, or to write a signature at the bottom of the page. In step 803, the user writes a second word, and in step 804 the system calculates the position of the second word and/or parts of the second word using images of the writing of the second word.

3. Mobile Device Camera Configurations for Pen and Gesture Tracking

A system and method for using image sensors on mobile devices to capture images of gestures and hand interactions are described. In some embodiments, a cell phone is used with a flip-out camera, a snaking camera holder, or a cell phone stand/holder.

In some embodiments, a device such as a cell phone with one or more image sensors is used to capture images of gestures and hand interactions.

In some embodiments, the cell phone has a component that can fold or be folded out to position an image sensor for a better view of a surface, such as a keyboard, paper or desk, for example, or just above such a surface.

In some embodiments, the cell phone camera has a shapeable arm with an image sensor, which can be shaped to point the image sensor at or just above a surface such as a keyboard, paper or desk.

In some embodiments, the cell phone has, or is used in conjunction with, a stand, that can be used to position the cell phone such that an image sensor is better able to capture images of a surface or the space just above a surface.

In some embodiments, an image sensor can be automatically pointed, e.g. based on image analysis, to track a hand, or motion above a surface such as a keyboard, paper, desk, etc.

As described herein, the system may include a device such as a cell phone with one or more image sensors.

Figure 9:
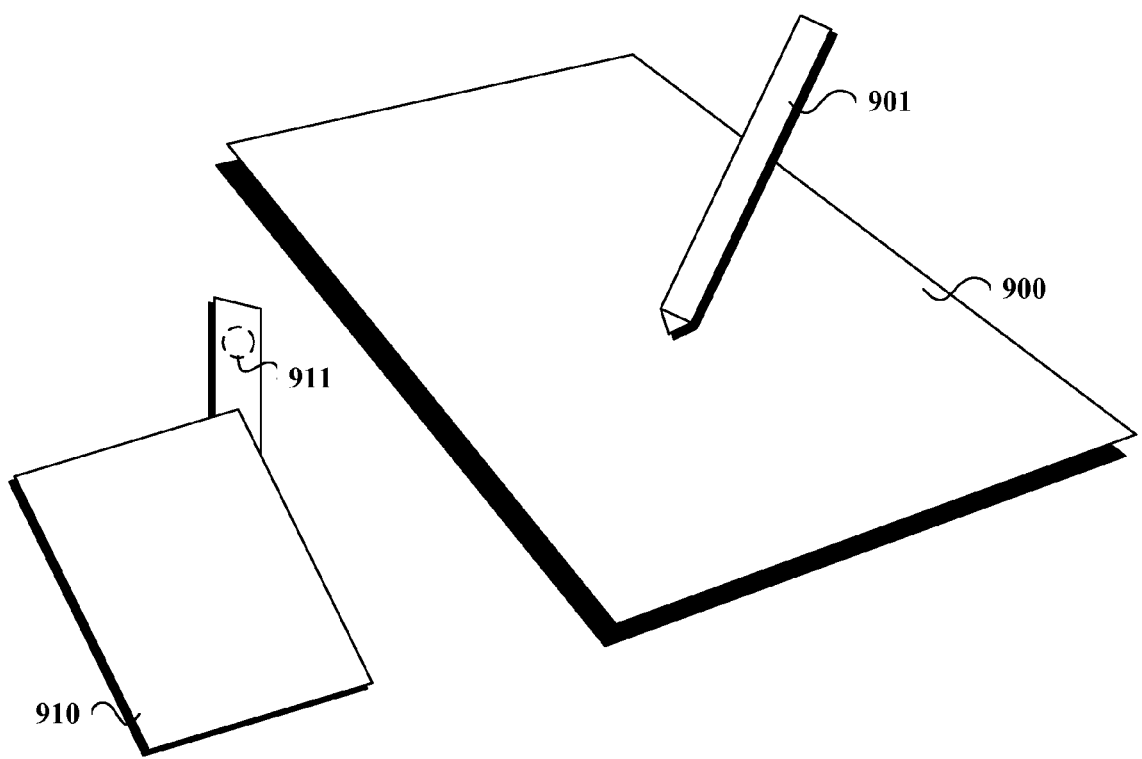
FIG. 9 shows an example input pen and surface.

Referring to FIG. 9, in some embodiments, a cell phone 910 has a flipout arm with an image sensor 911, that can be positioned to capture images of an interaction, e.g. with a pen 901, on or above a surface, such as a paper 900.

As described herein, the system may include a device such as a cell phone with one or more image sensors.

Figure 10:
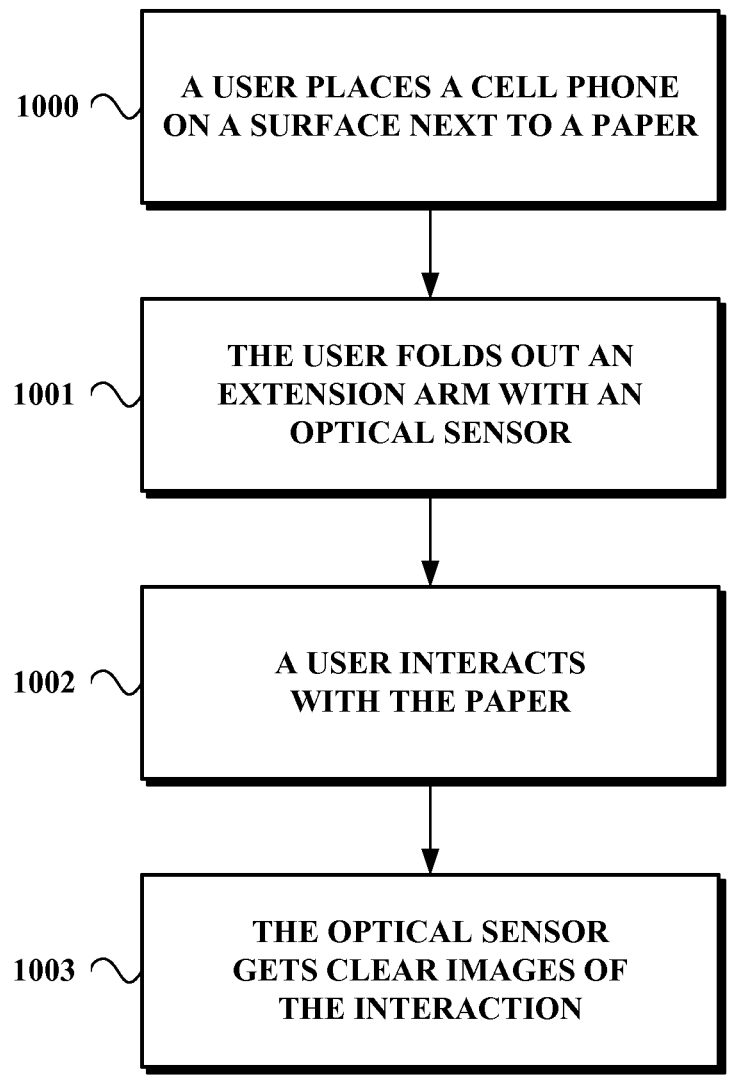
FIG. 10 shows an example pen- and/or gesture-tracking method

Referring to FIG. 10, in some embodiments, a user may place a cell phone on a surface next to a paper, in step 1000. The user folds out an extension arm with an optical sensor in step 1001. A user interacts with the paper in step 1002. The optical sensor captures images of the interaction, in step 1003.

4. Overview of Receiving Dynamic User Inputs Based on Pressure

Common touch-based interfaces may enable a user to input data and/or execute certain operations by, among other things, using gestures (e.g. pointing and clicking) However, the present methods, devices, and systems advantageously enable a user to potentially more efficiently, conveniently, and intuitively interact with a touch-based interface by applying varying pressures to a touch-based interface to input data and/or execute certain operations. That is, certain of the methods, devices, and systems described herein may enable a user to interact with a touch-based interface by varying the pressure the user applies to the touch-based interface.

In some embodiments, a user may cause a computing system to initiate one or more operations as a result of decreasing and/or increasing the pressure of one or more touch interactions among various pressure ranges. In other embodiments, a user may cause a computing system to initiate one or more operations as a result of decreasing and/or increasing the pressure of one or more touch interactions relative to various pressure-level thresholds.

As one example, a user may touch a stylus to a computing device's touchscreen interface. Then, without lifting the stylus from the touchscreen, the user may increase the pressure applied by the stylus to the touchscreen interface. According to an exemplary embodiment, the computing device may interpret this increasing-pressure touch interaction as a specific type of instruction, which is different from a simple touch or tap. For example, the computing device may interpret a simple touch or tap in a similar manner as a single-click of a mouse is commonly interpreted, and interpret the increasing-pressure touch interaction in a similar manner is a double-click of a mouse is commonly interpreted. As another example, the computing device may interpret a simple touch or tap in a similar manner as a left-click of a mouse is commonly interpreted, and interpret the increasing-pressure touch interaction in a similar manner is a right-click of a mouse is commonly interpreted. Other examples are also possible.

In a further aspect, some embodiments may involve distinguishing between different touch interactions based on the length of the touch interaction. For example, a shorter touch of a stylus to a touchscreen interface (e.g., for less than a threshold period of time) may be interpreted as a single-click in some applications, or as a left-click in other applications. However, a longer touch of a stylus to the touchscreen interface (e.g., for more than the threshold period of time) may be interpreted as a double-click in some applications, or as a right-click in other applications. Other examples are also possible.

5. Example Devices and Systems

Exemplary computing systems, which may be configured to implement exemplary methods, will now be described in greater detail.

a. Example Input Devices

Figure 11A:
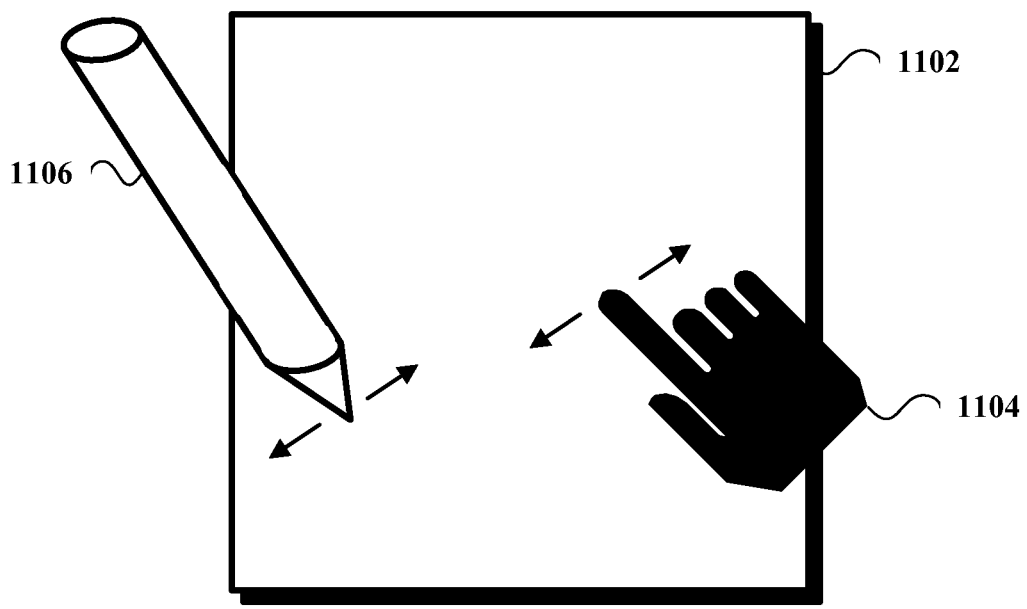
FIG. 11A shows an example touch-based interface in accordance with an example embodiment.

FIG. 11A shows an example touch-based interface 1102 in accordance with an example embodiment. A user may input data via touch-based interface 1102 using gestures. For example, as indicated by hand 1104, a user may input data by moving, swiping, pointing, and/or tapping one or more fingers on a surface of touch-based interface 1102. Other gestures may be used as well. Alternatively, a user may input data via touch-based interface 1102 using pen device 1106. For example, a user may input data by writing, moving, pointing, and/or tapping pen device 1106 on a surface of touch-based interface 1102. Other actions to input data via pen device 1106 may be used as well. Pen device 1106 may take any of the forms discussed above with respect to FIGS. 1, 3, 5, 7, and, 9. Further aspects of an example pen device are discussed below with respect to FIG. 2.

Figure 11B:
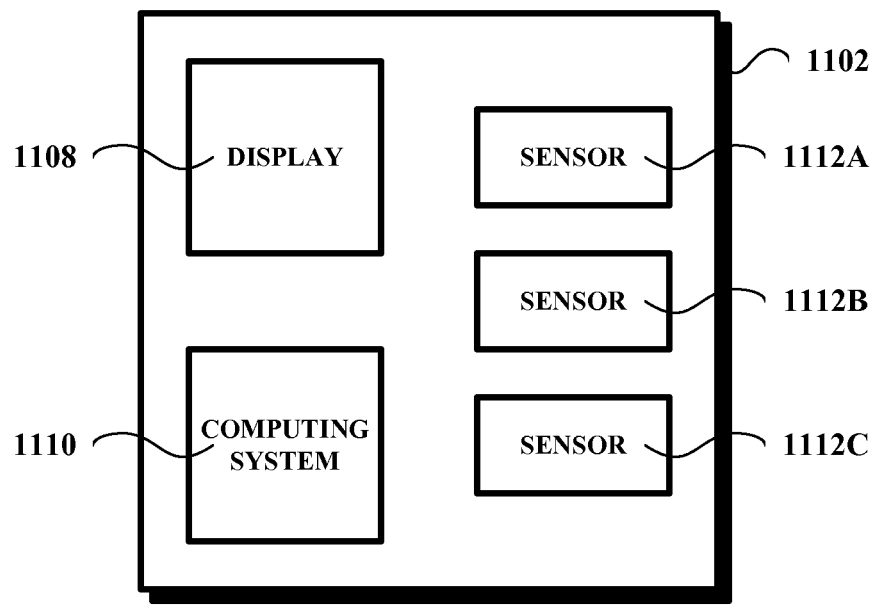
FIG. 11B shows a simplified block diagram of functional components that may be included in the example touch-based interface shown in FIG. 1A.

FIG. 11B shows a simplified block diagram of functional components that may be included in example touch-based interface 1102. In an example, touch-based interface 1102, may include on or more of a display 1108, a computing system 1110, and a variety of sensors, such as sensors 1112A-1112C. Display 108 may be a graphic display that is placed on top of, or otherwise attached to, touch-based interface 1102. For instance, display 1108 may be a graphic display that is embedded in touch-based interface 1102 (i.e., touch-based interface 1102 may be a touchscreen), such that users may interact directly with the graphic display by touching the graphic display itself.

Computing system 1110 may be any computing system configured to carry out the touch-based-interface functions described herein. Computing system 1110 may be integrated with touch-based interface 1102. Alternatively, touch-based interface 1102 may be communicatively coupled to, perhaps via a wired and/or wireless network connection, computing system 1110. Computing system 1110 may take on any suitable form, and may include various components, including any of those components described below with respect to computing system 1350 shown in FIG. 13B.

Each of sensors 1112A-1112C may be any sensor that may be used to carry out the touch-based-interface functions described herein. Although three sensors are shown in FIG. 11B, it should be understood that touch-based interface 1102 may include any number of sensors, including more, or less, sensors than sensors 1112A-1112C. For purposes of example and explanation only, any of sensors 1112A-1112C may include, but are not limited to, a temperature sensor, an accelerometer, a gyroscope, a compass, a barometer, a moisture sensor, one or more electrodes, a shock sensor, one or more chemical sample and/or analysis systems, one or more biological sensors, an ambient light sensor, a microphone, and/or a digital camera, among others.

Touch-based interface 1102 may include multi-touch sensing capabilities. Touch-based interface 1102 may implement any one or more touch-sensing technologies including, but not limited to, bending-wave touch, dispersive-signal touch (DST), in-cell, infrared touch (IR), optical-touch technology (including, e.g., near-field imaging (NFI) and/or optical imaging), projected-capacitive touch (PST), resistive touch, surface-acoustic-wave touch (SAW), surface-capacitive touch, and/or other touch-sensing technologies now known or later developed.

Figure 12:
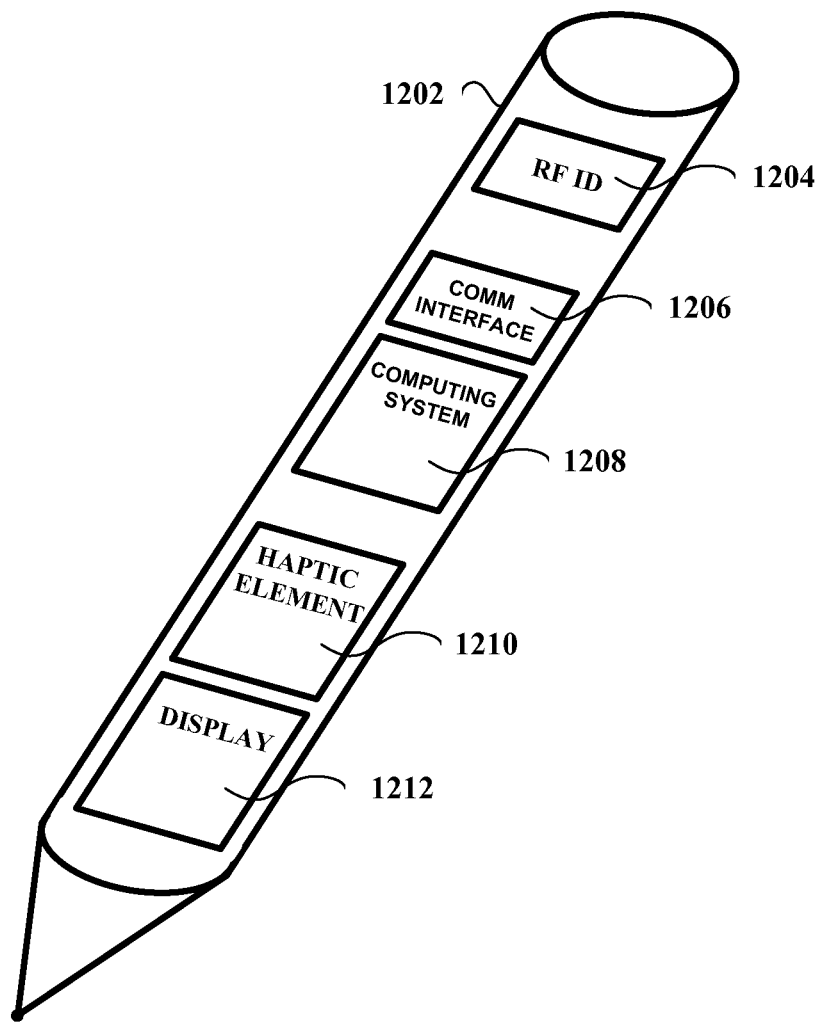
FIG. 12 shows a simplified block diagram of functional components that may be included in an example pen device in accordance with an example embodiment.

FIG. 12 shows a simplified block diagram of functional components that may be included in an example pen device 1202 in accordance with an example embodiment. As shown, example pen device 1202 includes a radio-frequency identification (RFID) circuit 1204, a communication interface 1206, a computing system 1208, a haptic element 1210, and a display 1212. It should be understood that the functional components shown in FIG. 12 are only examples of functional components that example pen device 1202 may include, and that less then, or more than, those functional components shown may be included in example pen device 1202.

RFID 1204 may be any passive or active circuitry arranged to transmit information that identifies pen device 1202. For example, RFID 1204 may include an antenna for receiving and transmitting such information. RFID 1204 may be arranged to communicate an identification of pen device 1202 to touch-based interface 1102, perhaps by way of computing system 1110. RFID 1204 may be arranged to communicate an identification of pen device 1202 to any other computing system, wireless receiver, or other device configured to receive such information.

RFID 1204 may be separate from, or integrated with, communication interface 1206. Communication interface 1206 may be a wired interface. Alternatively, communication interface 1206 may include one or more antennas, chipsets, and/or other components for communicating with computing systems and/or other devices, such as computing system 1110, over an air interface. Communication interface 1206 may be arranged to communicate according to one or more communication protocols such as Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, and/or any communication protocol now known or later developed.

Communication interface 1206 may be separate from, or integrated with, computing system 1208. Computing system 1208 may be any computing system configured to carry out the pen-device functions described herein. Computing system 1208 may be integrated with pen device 1202. Alternatively, pen device 1202 may be communicatively coupled to, perhaps via a wired and/or wireless network connection, computing system 1208. Computing system 1208 may take on any suitable form, and may include various components, including any of those components described below with respect to computing system 1350 shown in FIG. 13B.

Haptic element 1210 may include any tactile-feedback technology arranged to apply forces, vibrations, and/or motions to the user at the user's point of interaction with pen device 1202. Such feedback may be provided in response to user inputs. Pen device 1202 may include other feedback elements including, but not limited to auditory feedback elements (e.g., a speaker) and/or visual feedback elements (e.g., a graphic display, such as display 1212).

Display 1212 may be a graphic display that is placed on top of, or otherwise attached to, pen device 1202. For instance, display 1212 may be a graphic display that is embedded in pen device 1202, such that users may interact directly with the graphic display by touching the graphic display itself.

b. Example Computing Systems

Figure 13A:
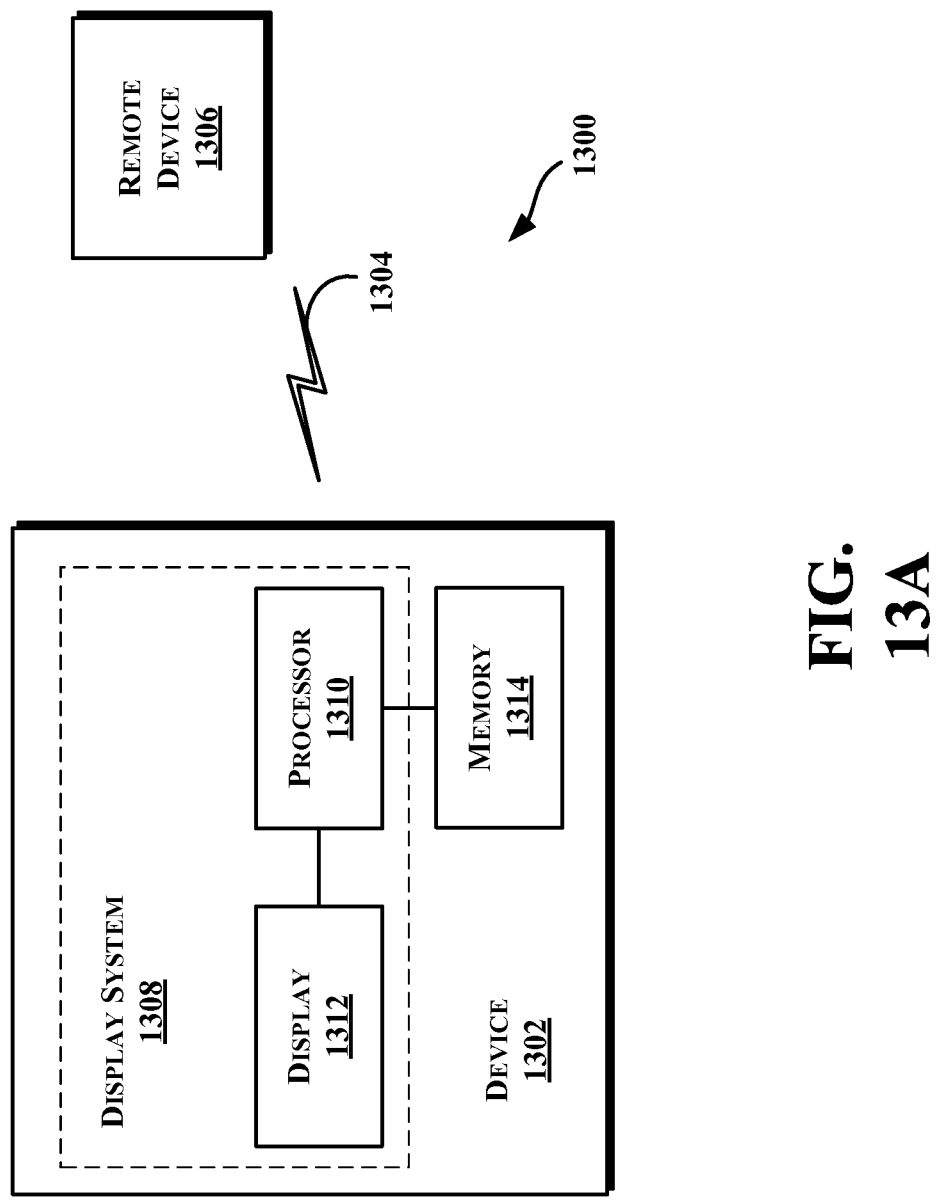
FIG. 13A shows a simplified block diagram of an example networked computing device.

FIG. 13A shows a simplified block diagram of an example networked computing device 1302. In one system 1300, a device 1302 communicates using a communication link 1304 (e.g., a wired or wireless connection) to a remote device 1306. The device 1302 may be any type of device that can receive data and display information corresponding to or associated with the data. For example, device 1302 may be a pen device, such as pen device 1202 shown in FIG. 12.

Thus, device 1302 may include display system 1308 including a processor 1310 and a display 1312. Display 1312 may be, for example, a graphic display. Processor 1310 may by any type of processor, such as a microprocessor or a digital signal processor, for example. Device 1302 may further include on-board data storage, such as memory 1314 coupled to processor 1310. Memory 1314 may store software that can be accessed and executed by processor 1310, for example.

Remote device 1306 may be any type of computing device or transmitter including a laptop computer, a mobile telephone, a network server, etc., that is configured to transmit data to device 1302. Remote device 1306 and device 1302 may contain hardware to enable communication link 1304, such as processors, transmitters, receivers, antennas, etc.

In FIG. 13A, communication link 1304 is illustrated as a wireless connection; however, wired connections may also be used. For example, communication link 1304 may be a wired link via a serial bus such as a universal serial bus or a parallel bus. Such a wired connection may be a proprietary connection as well. Communication link 1304 may also be a wireless connection that uses, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. Remote device 1306 may be accessible via the Internet and may comprise a computing cluster associated with a particular web service (e.g., social-networking, photo sharing, address book, etc.).

Figure 13B:
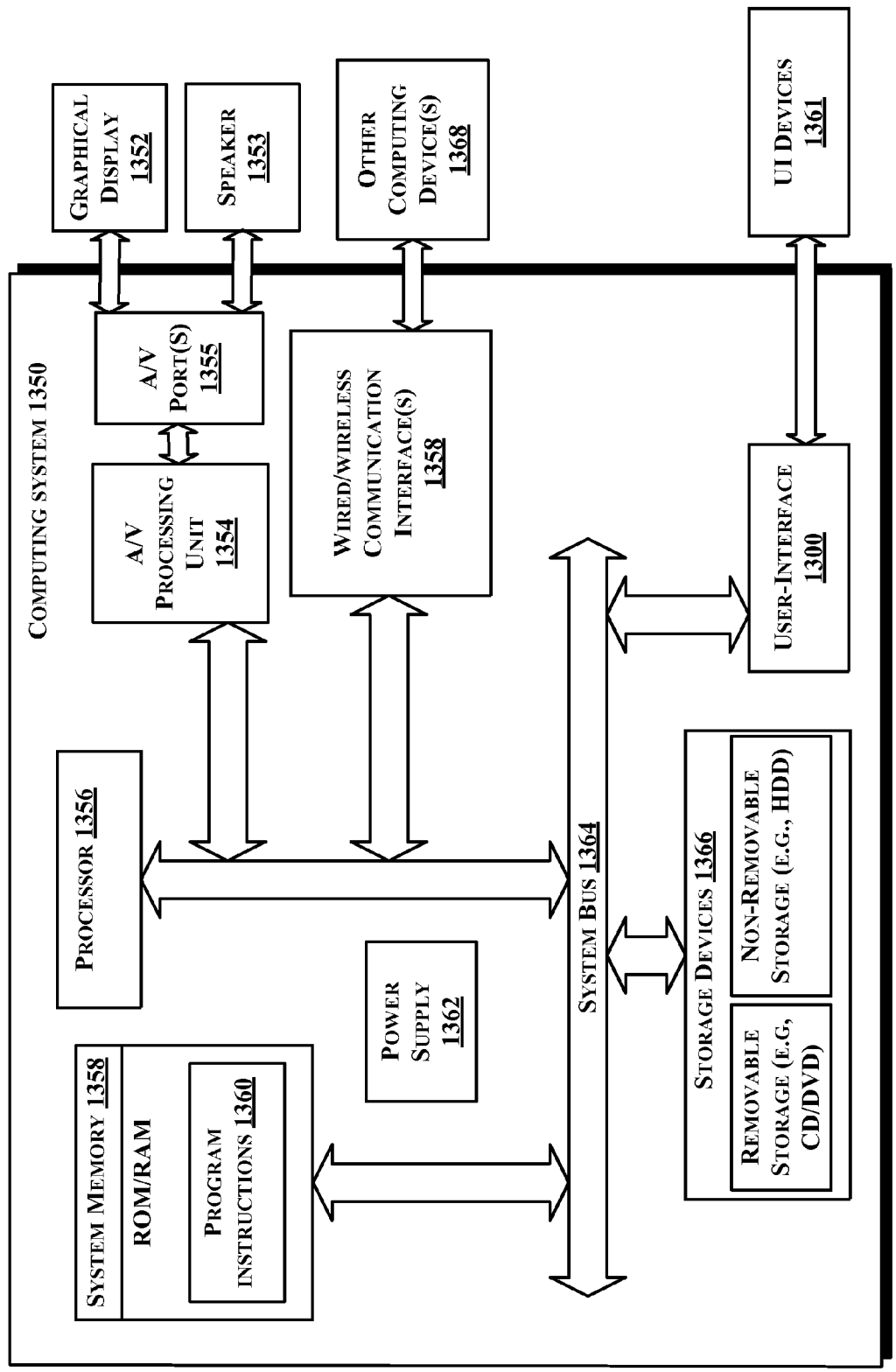
FIG. 13B shows a simplified block diagram depicting components of an example computing system.

Now, with reference again to FIGS. 11A-11B and 12, recall that example touch-based interface 1102 and/or pen device 1202 may include, or may otherwise be communicatively coupled to, a computing system such as computing system 1110 and computing system 1208, respectively. Such a computing system may take the form of example computing system 1350 as shown in FIG. 13B. Additionally, one, or each, of device 1302 and remote device 1306 may take the form of computing system 1350.

FIG. 13B shows a simplified block diagram depicting components of an example computing system 1350. Computing system 1350 may include at least one processor 1356 and system memory 1358. In an example embodiment, computing system 1350 may include a system bus 1364 that communicatively connects processor 1356 and system memory 1358, as well as other components of computing system 1350. Depending on the desired configuration, processor 1356 can be any type of processor including, but not limited to, a microprocessor (µP), a microcontroller (µC), a digital signal processor (DSP), or any combination thereof. Furthermore, system memory 1358 can be of any type of memory now known or later developed including but not limited to volatile memory (such as RAM), non-volatile memory (such as ROM, flash memory, etc.) or any combination thereof.

An example computing system 1350 may include various other components as well. For example, computing system 1350 includes an A/V processing unit 1354 for controlling graphical display 1352 and speaker 1353 (via A/V port 1355), one or more communication interfaces 1358 for connecting to other computing devices 1368, and power supply 1362. Graphical display 1352 may be arranged to provide a visual depiction of various input regions provided by user-interface 1300. Note, also, that user-interface 1300 may be compatible with one or more additional user-interface devices 1361 as well.

Furthermore, computing system 1350 may also include one or more data storage devices 1366, which can be removable storage devices, non-removable storage devices, or a combination thereof. Examples of removable storage devices and non-removable storage devices include magnetic disk devices such as flexible disk drives and hard-disk drives (HDD), optical disk drives such as compact disk (CD) drives or digital versatile disk (DVD) drives, solid state drives (SSD), and/or any other storage device now known or later developed. Computer storage media can include volatile and nonvolatile, removable and non-removable media implemented in any method or technology for storage of information, such as computer readable instructions, data structures, program modules, or other data. For example, computer storage media may take the form of RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by computing system 1350.

Figure 15A:
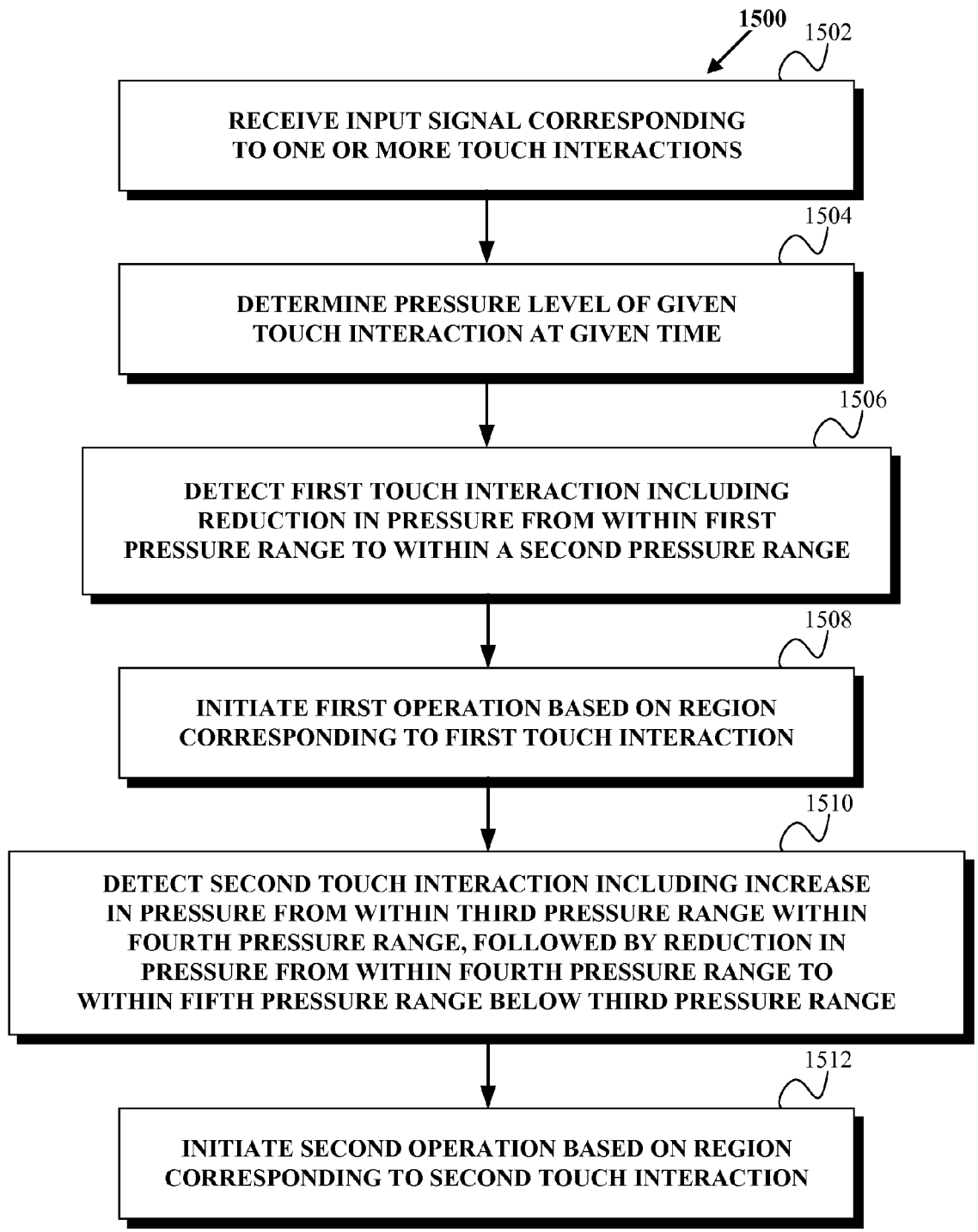
FIG. 15A shows a flowchart depicting an example method for receiving dynamic user inputs based on pressure.
Figure 15B:
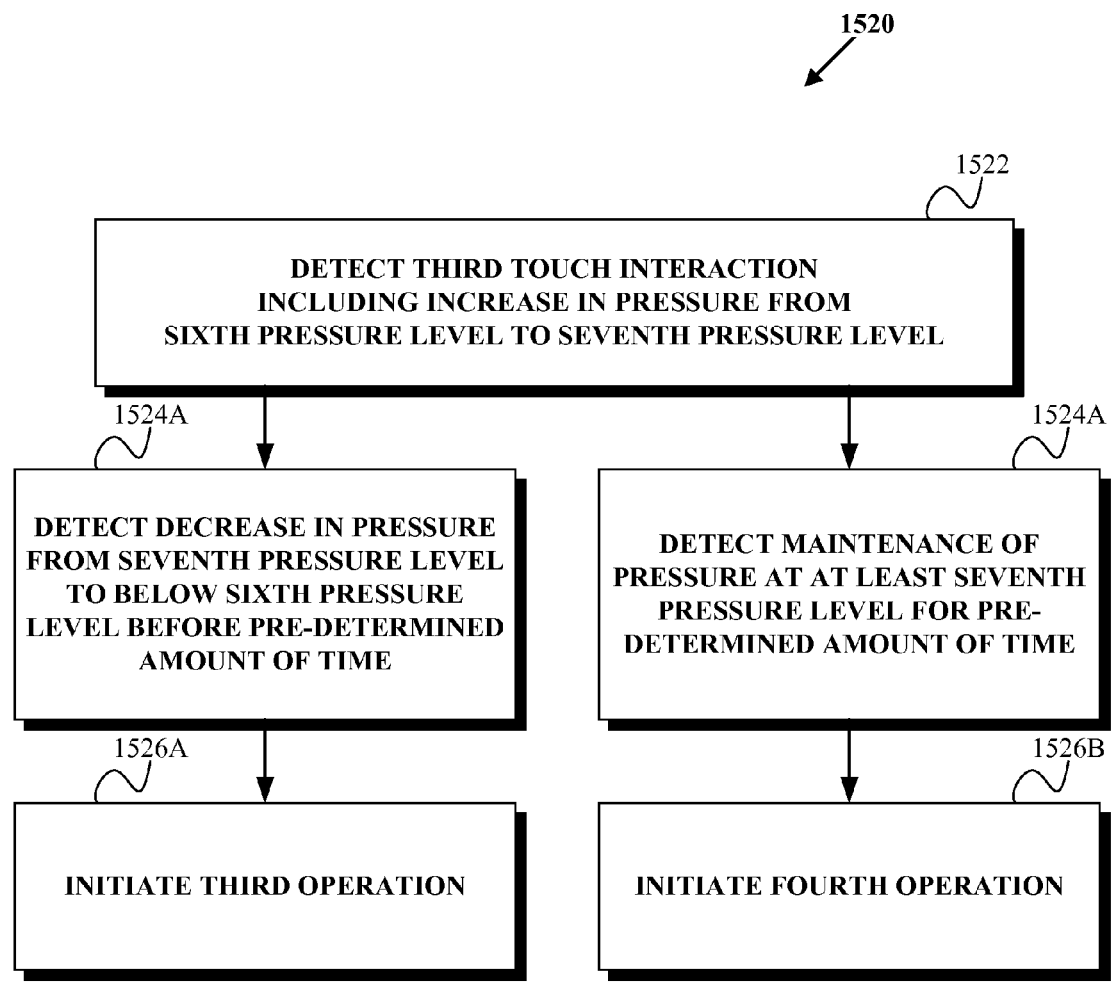
FIG. 15B shows a flowchart depicting another example method for receiving dynamic user inputs based on pressure.
Figure 16:
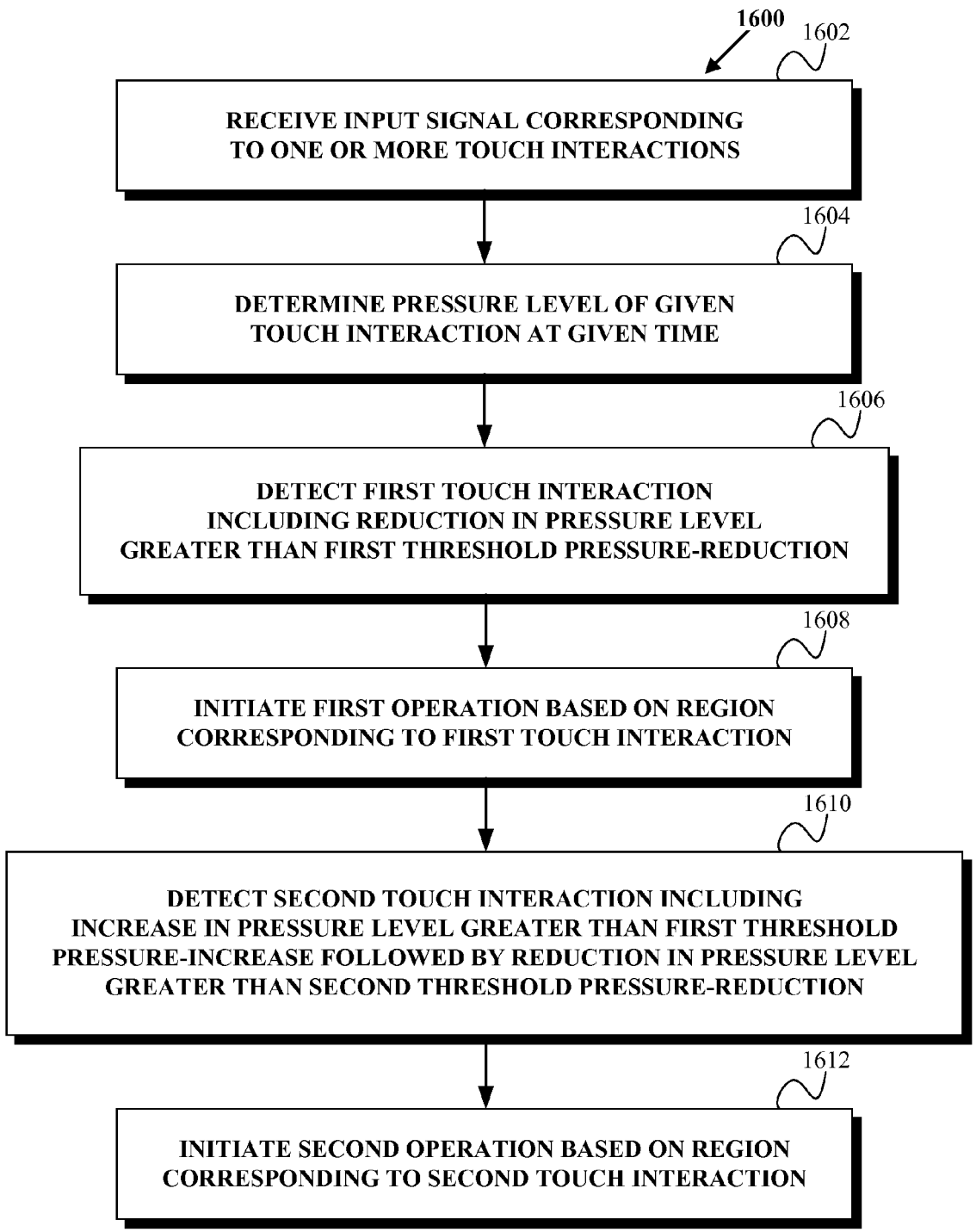
FIG. 16 shows a flowchart depicting another example method for receiving dynamic user inputs based on pressure.

According to an example embodiment, computing system 1350 may include program instructions that are stored in system memory 1358 (and/or possibly in another data-storage medium) and executable by processor 1356 to facilitate the various functions described herein including, but not limited to, those functions described with respect to FIGS. 15A-15B and 16. Although various components of computing system 1350 are shown as distributed components, it should be understood that any of such components may be physically integrated and/or distributed according to the desired configuration of the computing system.

As yet another example, a computing system may initiate an action to provide feedback via a pen device that was used for the touch interaction. For instance, the computing system may send a feedback message to the pen device. The feedback message may instruct the pen device to provide feedback based on the touch interaction and the determined user-profile. Such feedback may include vibration of the pen device, perhaps by a haptic element or more generally, by a motor that vibrates the pen device. Further, in some embodiments, certain vibration patterns may correspond to certain types of feedback. For example, a long vibration may indicate an error in the input from the pen device, while one or two short vibrations may indicate that input was correctly provided. Other examples are also possible.

Alternatively, or additionally, the computing system may send the pen device a feedback message that indicates a feedback message for display on a graphic display of the pen device. Other examples of feedback at the pen device may exist as well.

Further, the computing system may communicate a feedback message to the pen device in various ways. For example, the computing system may communicate with the pen device wirelessly using WiFi, Bluetooth, or other another wireless communication protocol. It is also possible that the computing system may communicate with the pen device via a wired connection.

c. Exemplary Wearable Computing System

In an example embodiment, user interface 1400 and a touch-based interface such as touch-based interface 1102 may be integrated into a system that is configured for receiving, transmitting, and displaying data, such as a wearable computing device. One particular type of wearable computing device is a head-mounted display (HMD). An HMD typically provides a heads-up display near to the user's eyes in such a manner that the user perceives the computer-generated graphics and the physical world simultaneously. In accordance with the systems and methods described herein, the heads-up display may include a user-interface graphic display.

Figure 14A:
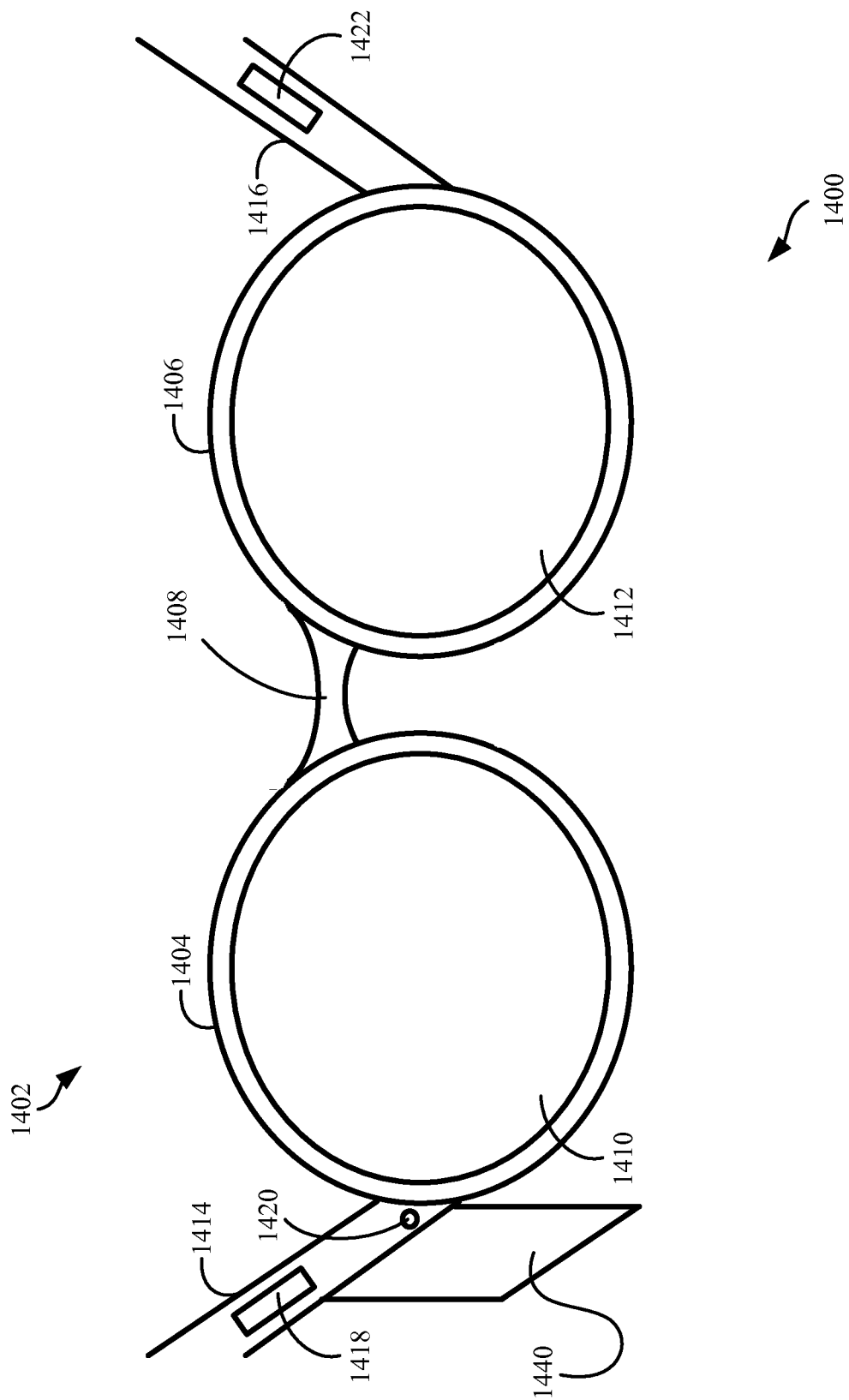
FIG. 14A shows a first view of an example wearable computing system including a touch-based interface and a heads-up display in accordance with an example embodiment.

FIG. 14A illustrates example system 1400 for receiving, transmitting, and displaying data. System 1400 is shown in the form of a wearable computing device that includes an HMD. While FIG. 14A illustrates eyeglasses 1402 as an example of a wearable computing device, other types of wearable computing devices could additionally or alternatively be used. As illustrated in FIG. 14A, eyeglasses 1402 comprise frame elements including lens-frames 1404 and 1406 and center frame support 1408, lens elements 1410 and 1412, and extending side-arms 1414 and 1416. Center frame support 1408 and extending side-arms 1414 and 1416 are configured to secure eyeglasses 1402 to a user's face via a user's nose and ears, respectively. Each of frame elements 1404, 406, and 1408 and extending side-arms 1414 and 1416 may be formed of a solid structure of plastic or metal, or may be formed of a hollow structure of similar material so as to allow wiring and component interconnects to be internally routed through eyeglasses 1402. Each of lens elements 1410 and 1412 may be formed of any material that can suitably display a projected image or graphic. Each of lens elements 1410 and 1412 may also be sufficiently transparent to allow a user to see through the lens element.

Extending side-arms 1414 and 1416 are each projections that extend away from frame elements 1404 and 1406, respectively, and are positioned behind a user's ears to secure eyeglasses 1402 to the user. Extending side-arms 1414 and 1416 may further secure the eyeglasses 1402 to the user by extending around a rear portion of the user's head. Additionally or alternatively, for example, system 1400 may connect to or be affixed within a head-mounted helmet structure. Other possibilities exist as well.

System 1400 may also include on-board computing system 1418, video camera 1420, and sensor 1422. On-board computing system 1418 is shown to be positioned on extending side-arm 1414 of eyeglasses 1402; however, on-board computing system 1418 may be provided on other parts of eyeglasses 1402. On-board computing system 1418 may include a processor and memory, for example. On-board computing system 1418 may be configured to receive and analyze data from video camera 1420 (and possibly from other sensory devices, user interfaces, or both). More generally, on-board computing system may include any of those components and/or functional capabilities as described herein with respect to computing system 1350.

Video camera 1420 is shown to be positioned on extending side-arm 1414 of eyeglasses 1402; however, video camera 1420 may be provided on other parts of eyeglasses 1402. Video camera 1420 may be configured to capture images at various resolutions or at different frame rates. Many video cameras with a small form-factor, such as those used in cell phones or webcams, for example, may be incorporated into an example of system 1400. Although FIG. 14A illustrates one video camera 1420, more video cameras may be used, and each may be configured to capture the same view, or to capture different views.

Sensor 1422 is shown mounted on extending side-arm 1416 of eyeglasses 402; however, sensor 1422 may be provided on other parts of eyeglasses 1402. Sensor 1422 may include one or more of a gyroscope or an accelerometer, for example. Other sensing devices may be included within sensor 1422 or other sensing functions may be performed by sensor 1422.

Figure 14B:
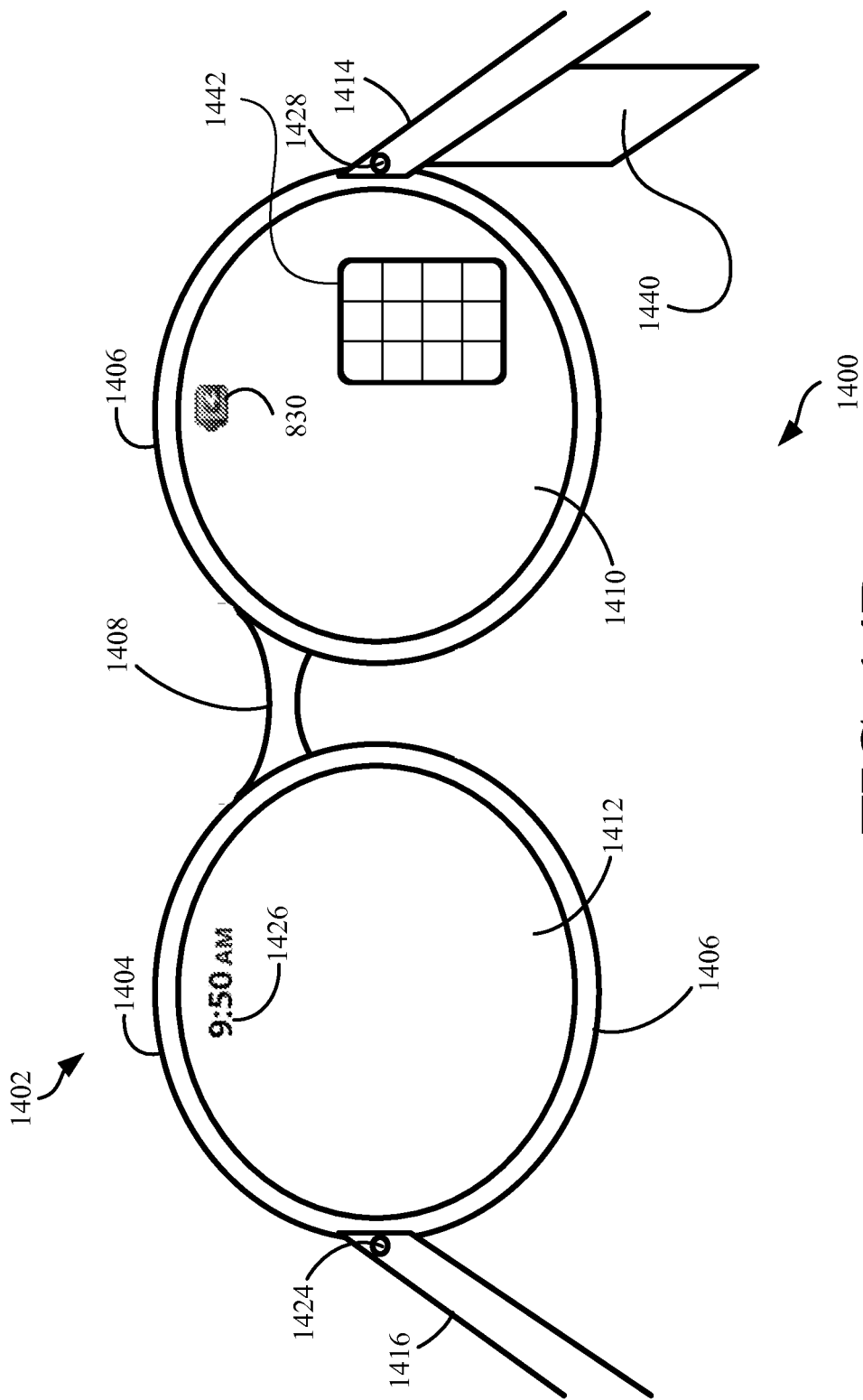
FIG. 14B shows a second view of the example wearable computing system shown in FIG. 14A.

FIG. 14B illustrates an alternate view of system 1400 of FIG. 14A. As shown in FIG. 14B, lens elements 1410 and 1412 may act as display elements. Eyeglasses 1402 may include first projector 1424 coupled to an inside surface of extending side-arm 1416 and configured to project display 1426 onto an inside surface of lens element 1412. Additionally or alternatively, second projector 1428 may be coupled to an inside surface of extending side-arm 1414 and configured to project display 1430 and/or heads-up display 1442 onto an inside surface of lens element 1410.

Lens elements 1410 and 1412 may act as a combiner in a light projection system and may include a coating that reflects the light projected onto them from projectors 1424 and 1428. In some embodiments, a special coating may not be required (e.g., when projectors 1424 and 1428 are scanning laser devices).

In alternative embodiments, other types of display elements may also be used. For example, lens elements 1410, 1412 themselves may include a transparent or semi-transparent matrix display, such as an electroluminescent display or liquid crystal display. A corresponding display driver may be disposed within frame elements 1404 and 1406 for driving such a matrix display. Alternatively or additionally, a laser or LED source and scanning system could be used to draw a raster display directly onto the retina of one or more of the user's eyes. Other possibilities exist as well.

As noted above, a heads-up display 1442 may be integrated into one of lens elements 1410 and 1412 in any manner described above. Thus, system 1400 may present heads-up display 1442 so that the user may see a user-interface graphical display and the physical world simultaneously.

System 1400 may also include touch-based interface 1440, which may be arranged similar to touch-based interface 1102, and may be attached to extending side-arm 1414 or another suitable component of eyeglasses 1402. In this way, a user may interact with user-interface 1440 while wearing eyeglasses 1402 and observing visual depictions of input-movements and other computing functions in heads-up display 1442.

Figure 14C:
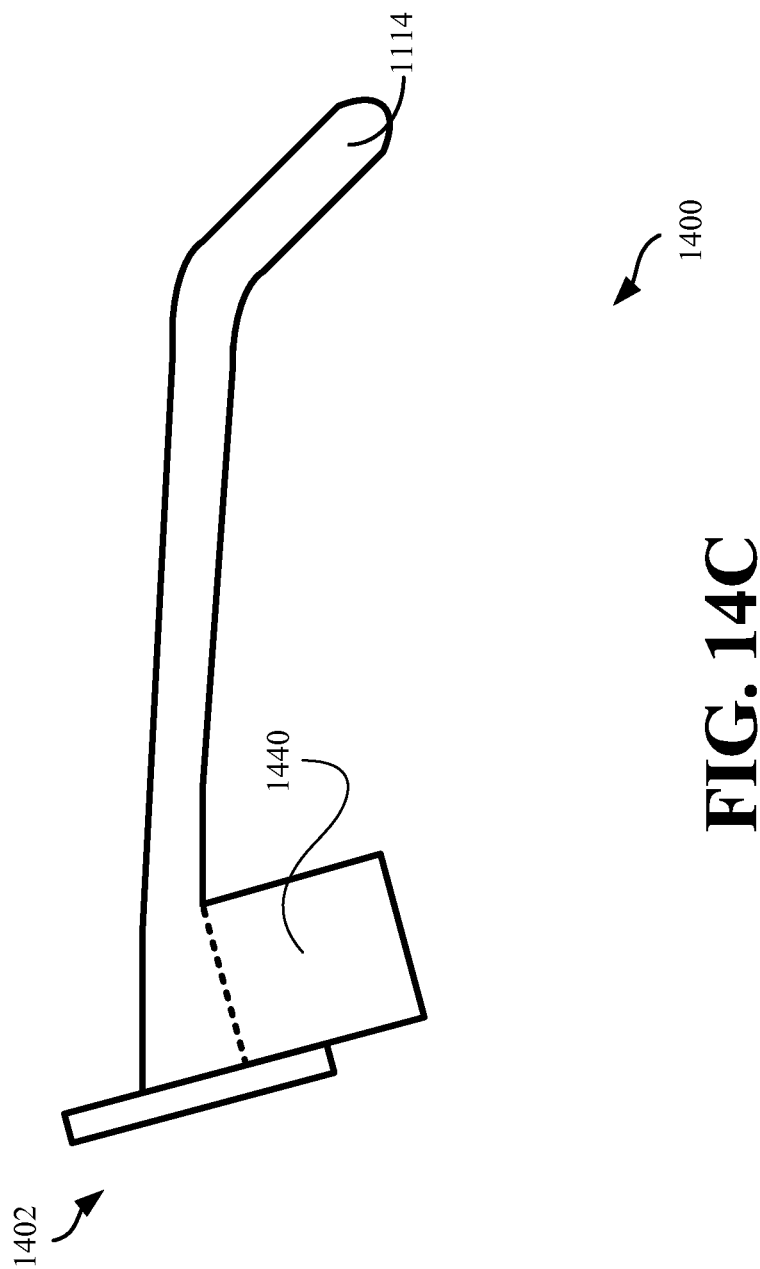
FIG. 14C shows a third view of the example wearable computing system shown in FIGS. 14A and 14B.

FIG. 14C shows yet another view of system 1400, from the side. FIG. 14C depicts an alternative view of extending side-arm 1414 and user-interface 1440. Certain additional components, including any of those components shown and described with respect to computing system 1350, may also be integrated into system 1400 such that a computing system configured to carry out any of the functions described herein may be entirely contained by system 1400 and integrated into eyeglasses 1402.

6. Exemplary Methods

FIG. 15A shows a flowchart depicting method 1500 for receiving dynamic user inputs based on pressure, according to an exemplary embodiment. Aspects of example method 1500 may be carried out by any suitable computing system, or any suitable components thereof.

In the embodiment described by method 1500, the computing system detects (and/or analyzes or evaluates) the pressure level of a given touch interaction in the context of pressure ranges. In this way, it may be possible to give the user a certain controllable degree of "latitude" in defining the touch interactions that the user carries out with the intent of initiating operations based on pressure variations.

Example method 1500 begins at block 1502, where the computing system receives an input signal corresponding to one or more touch interactions on a touch-based interface. At block 1504, the computing system determines a pressure level of a given touch interaction at a given time. At block 1506, the computing system detects a first touch interaction including a reduction in pressure level from within a first pressure range to within a second pressure range. At block 1508, the computing system, responsive to detecting the first touch interaction, initiates a first operation based on a region of the touch-based interface that corresponds to the first touch interaction. At block 1510, the computing system detects a second touch interaction including an increase in pressure from within a third pressure range within a fourth pressure range, followed by a reduction in pressure from within the fourth pressure range to within a fifth pressure range below the third pressure range. And at block 1512, the computing system, responsive to detecting the second touch interaction, initiates a second operation based on a region of the touch-based interface that corresponds to the second touch interaction.

a. Receive Input Signal Corresponding to One or More Touch Interactions

The input signal corresponding to the touch interaction received at block 1502 may take various forms. For example, in some embodiments, the touch interaction may be associated with a finger touch. That is, a user may input data on the touch-based interface using a gesture of a finger (or multiple fingers). As another example, the touch interaction may be associated with a pen device (or stylus). That is, a user may input data on the touch-based interface by writing or tapping using the pen device. Those of skill in the art will appreciate that a user may input data in other manners consistent with the disclosure herein.

In an embodiment each of the touch interactions in accordance with block 1502 may be the application of pressure at a single point, or area, of the touch-based interface. Such an application of pressure may be carried out using a finger and/or a pen device. The first touch interaction and the second touch interaction may alternatively, or additionally, take any other form described herein.

b. Determine Pressure Level of Given Touch Interaction at Given Time

The pressure level determined by the computing system in accordance with block 1504 may involve the computing system sensing an applied pressure. Such sensing of an applied pressure may be performed in any suitable manner, including through the use of any suitable sensor. As a general matter, the touch-based interface may implement any suitable type of pressure-measurement approach including, but not limited to, absolute pressure sensing, gauge pressure sensing, and/or differential pressure sensing, among others. Further, the touch-based interface may implement any suitable type of pressure-sensing technology including, but not limited to, piezoresistive strain gauge sensors, capacitive sensors, electromagnetic sensors, piezoelectric sensors, optical sensors, potentiometric sensors, resonant sensors, thermal sensors, ionization sensors, and/or any other pressure-sensing technology now known or later developed.

c. Detect First Touch Interaction Including Reduction in Pressure from First Pressure Level to Second Pressure Level At block 1506, the computing system detects a first touch interaction including a reduction in pressure from a first pressure level to a second pressure level. In many embodiments, the first touch interaction may be a simple tap (i.e., a tap-and-release) on the touch-based interface. Such a tap interaction may involve the user initially pressing on the touch-based interface and then removing their finger or stylus from the touch-based interface. As such, in an exemplary method, the second pressure level may be a zero-pressure level that results from a substantial lack of pressure on the touch-based interface. Alternatively, the first touch interaction may involve the user initially pressing relatively hard on the touch-based interface and then decreasing the pressure of the touch such that the user then presses relatively softly on the touch-based interface. Other examples of reducing pressure from a first pressure level to a second pressure level may exist as well. In any event, block 1506 may be carried out using a finger, pen device, stylus, and/or other input device.

d. Initiate First Operation Based on Region Corresponding to First Touch Interaction The first operation initiated in accordance with block 1508 may be any desirable operation. As one example, the operation may be any one of a number of conventional computer-interaction functions including, but not limited to, single clicking, double clicking, highlighting, selecting, deleting, copying, cutting, and/or pasting. As another example, the operation may be any one of a number of user-defined, or application-defined, functions including, but not limited to, execution of an application-specific function (e.g., insert a figure in a word-processing application), execution of an application (e.g., opening an e-mail client or a web browser), and/or exiting an application (e.g., closing an e-mail client or a web browser). Other examples of operations may exist as well.

In accordance with block 1508, the operation may vary depending on the region in which the first touch interaction is carried out. For example, if the first touch interaction was carried out in the upper-right-hand quadrant of the touch-based interface, the operation may be execution of an e-mail client. As another example, if the first touch interaction was carried out in the upper-left-hand quadrant of the touch-based interface, the operation may be execution of a web browser. Other examples of varying the operation based on the region in which the first touch interaction was carried out may exist as well.

Further in accordance with block 1508, the operation may include loading one or more of (a) an error-correction menu, (b) a word-completion menu, and (c) a computing-action menu. For example, an error-correction menu may be loaded by the user after the user receives some indication that a word, perhaps a word entered by the user in word-processing context, is misspelt. Such an error-correction menu may include a selectable list of suggested spellings. As another example, a word-completion menu may be loaded by the user if the user is entering a long word, perhaps in an instant messaging or texting context. Such a word-completion menu may include a selectable list of suggested words. As another example still, a computing-action menu may be loaded by the user in a variety of contexts. Such a computing-action menu may include a selectable list of default, application-specific, or user-defined computing actions.

In accordance with block 1508, the menu loaded may vary depending on the region in which the first touch interaction is carried out. For example, if the first touch interaction was carried out in the upper-right-hand quadrant of the touch-based interface, the operation may be the loading of an error-correction menu. As another example, if the first touch interaction was carried out in the upper-left-hand-quadrant of the touch-based interface, the operation may be the loading of a word-completion menu. Other examples may exist as well.

e. Detect Second Touch Interaction Including an Increase in Pressure From Third Pressure Level to Fourth Pressure Level Followed by Decrease in Pressure from Fourth Pressure Level to Fifth Pressure Level Below Third Pressure Level At block 1510, the computing system detects a second touch interaction comprising an increase in pressure from a third pressure level to a fourth pressure level followed by a reduction in pressure from the fourth pressure level to a fifth pressure level below the third pressure level. As one example, a user may first increase an amount of pressure applied to the-touch-based interface, and then reduce the amount of pressure applied to the touch-based interface, while still maintaining contact with the touch-based interface. For instance, the third pressure level may correspond to a relatively soft press on the touch-based interface, the fourth pressure level may correspond to a relatively hard press on the touch-based interface, and the fifth pressure level may correspond to the user simply resting the input device (e.g., finger, pen device, etc.) on the touch-based interface. As another example, a user may first increase an amount of pressure applied to the touch-based interface, and then reduce the amount of pressure applied to the touch-based interface, and ultimately remove contact with the touch-based interface entirely. For instance, the third pressure level may correspond to a relatively soft press on the touch-based interface, the fourth pressure level may correspond to a relatively hard press on the touch-based interface, and the fifth pressure level may correspond to no pressure at all from the input device (e.g., the finger, pen device, etc. may not be in contact with the touch-based interface).

In an embodiment, the first pressure level may be equal to the third pressure level, and the second pressure level may be equal to the fifth pressure level. In other words, the first pressure level and the third pressure level may be considered the same "starting point" pressure level, while the second pressure level and the fifth pressure level may be considered the same "soft" pressure level.

In another embodiment, the second touch interaction may remain at the third pressure level for at least a predetermined period of time before the increase in pressure from the third pressure level to the fourth pressure level. As one example, the second touch interaction may involve the user pausing for one second, for example, at the third pressure level before increasing pressure to the fourth pressure level. By implementing such a time delay, the computing system may avoid interpreting a meaningless increase in pressure by the user as the user's intention to initiate a given operation.

In another embodiment, the second touch interaction may remain at the fourth pressure level for at least a predetermined period of time before the reduction in pressure from the fourth pressure level to the fifth pressure level. As one example, the second touch interaction may involve the user pausing for two seconds, for example, at the fourth pressure level before decreasing pressure to the fifth pressure level. By implementing such a time delay, the computing system may avoid interpreting a meaningless decrease in pressure by the user as the user's intention to initiate a given operation.

f. Initiate Second Operation Based on Region Corresponding to Second Touch Interaction The second operation initiated in accordance with block 1512 may be any desirable operation. The second operation may take the form of any of those first operations described above with respect to block 1508.

As shown in FIG. 15B, the user may carry out additional touch interactions to cause the computing system to initiate additional operations. Method 1520 includes block 1522, where the computing system detects a third touch interaction comprising an increase in pressure from a sixth pressure level to a seventh pressure level. Such an increase in pressure may take a form similar to that described above with respect to the increase in pressure from the fourth pressure level to the fifth pressure level.

The increase in pressure in accordance with block 1522 may then be followed by one of a decrease in pressure from the seventh pressure level to below the sixth pressure level before a pre-determined amount of time has lapsed, as indicated by block 1524A or a maintenance of pressure at at least the seventh pressure level for the pre-determined amount of time, as indicated by block 1524B. According to block 1526A, responsive to the decrease in pressure from the seventh pressure level to below the sixth pressure level before a pre-determined amount of time has lapsed at block 1524A, the computing system may initiate a third operation. According to block 1526B, responsive to the maintenance of pressure at at least the seventh pressure level for the pre-determined amount of time, the computing system may initiate a fourth operation. In this way, the user may disambiguate between a larger range of operations by either maintaining, or releasing, an increased level of pressure at the touch-based interface. The third and/or fourth operation may take the form of any of those first operations described above with respect to block 1508.

g. Detecting Pressure Changes Based on Pressure Thresholds

In some embodiments, an exemplary computing system may interpret a pressure increase by more than a threshold amount as an increasing-pressure touch interaction, which corresponds to a different operation than, for example, a simple tap interaction. In such an embodiment, the amount of pressure increase may be a relative amount. As a specific example, an increase in pressure by 50% or more from an initial pressure level may be interpreted as an increasing-pressure touch interaction. Many other examples are also possible.

FIG. 16 shows a flowchart depicting a method 1600 for receiving dynamic user inputs based on pressure, according to an exemplary embodiment. Aspects of example method 1600 may be carried out by any suitable computing system, or any suitable components thereof.

In the embodiment described by method 1600, the computing system detects (and/or analyzes or evaluates) the pressure level of a given touch interaction in the context of percentage increases and/or decreases (i.e., relative changes) in pressure ranges. In this way, it may be possible to dynamically control the touch interactions that the user carries out with the intent of initiating operations based on pressure variations. It will be appreciated that many of the principles described above with respect to method 1500 may apply to example method 1600. As such, method 1600 is described briefly below.

More specifically, example method 1600 begins at block 1602, where the computing system receives an input signal corresponding to one or more touch interactions on a touch-based interface. At step 1604, the computing system determines a pressure level of a given touch interaction at a given time. At step 1606, the computing system detects a first touch interaction including a reduction in pressure level greater than a first threshold pressure-reduction. At step 1608, the computing system, responsive to detecting the first touch interaction, initiates a first operation based on a region of the touch-based interface that corresponds to the first touch interaction. At step 1610, the computing system detects a second touch interaction including an increase in pressure level greater than a first threshold pressure-increase followed by a reduction in pressure level greater than a second threshold pressure-reduction. And at step 1612, the computing system, responsive to detecting the second touch interaction, initiates a second operation based on a region of the touch-based interface that corresponds to the second touch interaction.

In one embodiment, the increase in pressure level greater than the first threshold pressure-increase may involve an increase in the pressure level by at least a second predetermined percentage. In another embodiment, the reduction in pressure level greater than the second threshold pressure-reduction may involve a decrease in the pressure level by at least a third predetermined percentage.

7. Time-Based Interpretation of Touch Interactions

In some embodiments, a computing system may additionally or alternatively be configured to use time as a distinguishing factor for certain touch interactions. For instance, different operations may be associated with touch interactions of having different durations.

Figure 17:
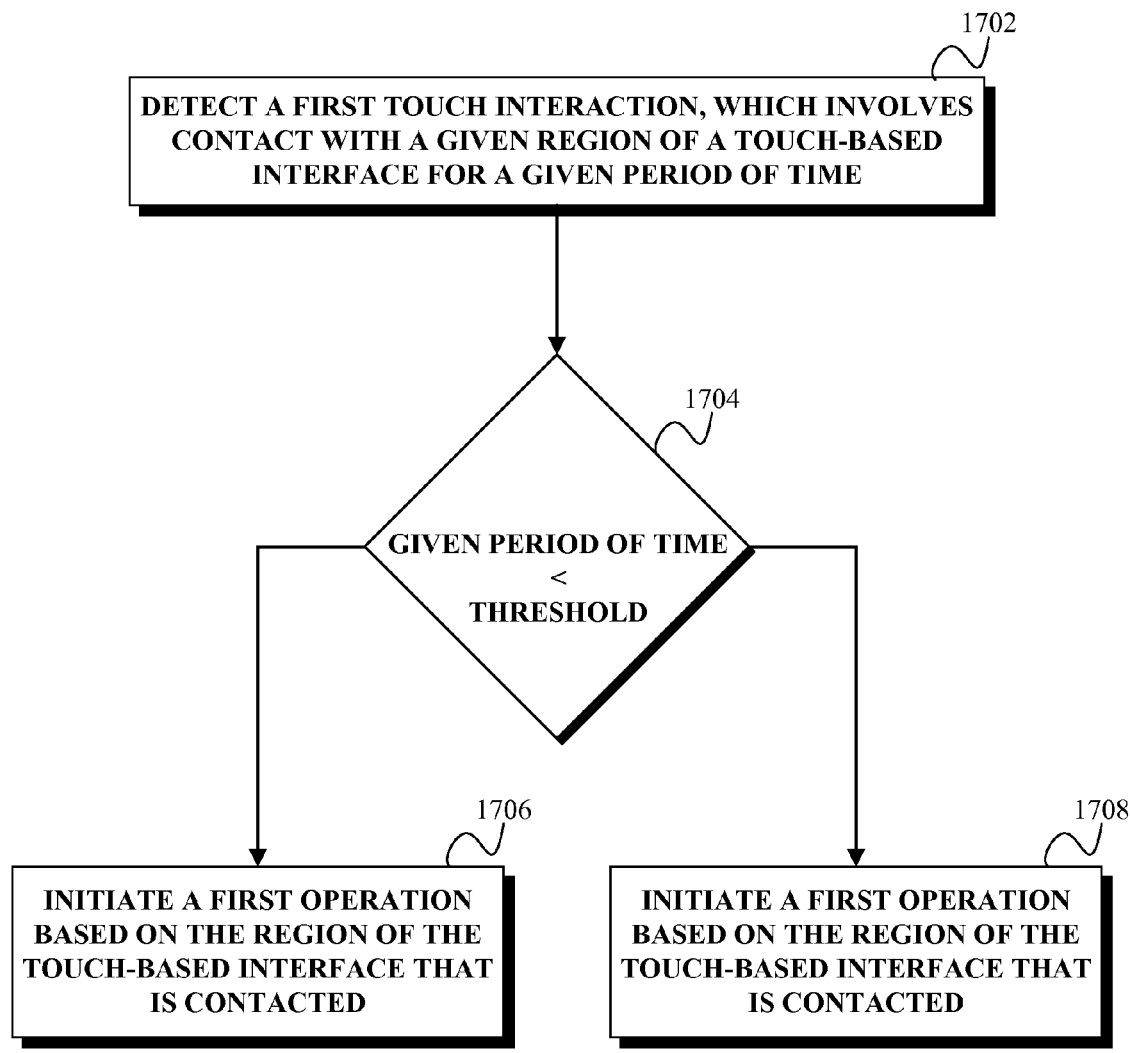
FIG. 17 shows a flowchart depicting method for receiving dynamic user inputs based on timing, according to an exemplary embodiment.

FIG. 17 shows a flowchart depicting method 1700 for receiving dynamic user inputs based on timing of applied pressure, according to an exemplary embodiment. Aspects of example method 1700 may be carried out by any suitable computing system, or any suitable components thereof.

More specifically, method 1700 involves a computing system detecting a first touch interaction, which involves contact with a given region of a touch-based interface for a given period of time, as shown by block 1702. Then, at block 1704, the computing system determines whether or not the given period of time is less than a threshold period of time. If the given period of time is less than the threshold period of time, then the computing system may initiate a first operation based on the region of the touch-based interface that is contacted, as shown by block 1706. On the other hand, if the given period of time is greater than the threshold period of time, then the computing system may initiate a second operation based on the region of the touch-based interface that is contacted, as shown by block 1708.

In some embodiments, the first operation, which is associated with a shorter touch, may be similar to the operation that is typically carried out upon a single-click of a mouse, while the second operation, which is associated with a longer touch, may be similar to the operation that is typically carried out upon a double-click of a mouse. Further, in some embodiments, the first operation may be similar to the operation that is typically carried out upon a left-click of a mouse, while the second operation may be similar to the operation that is typically carried out upon a right-click of a mouse. Other examples are also possible.

In a further aspect, some embodiments may interpret a touch interaction based on time and pressure. For example, if a stylus increases the pressure that is applied to a touch-screen in a manner similar to illustrated by methods 1500 and 1600, a computing system might further determine how long the stylus remains in contact after increasing the pressure. The computing system might then require that the pressure remain above a threshold level for at least a certain period of time, before interpreting the touch interaction as, for example, a non-single-click action such as a double-click or right click. Other examples are also possible.

8. Conclusion

It should be understood that for situations in which the embodiments discussed herein collect and/or use any personal information about users or information that might relate to personal information of users, the users may be provided with an opportunity to opt in/out of programs or features that involve such personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

We claim:
1. A system comprising:
a non-transitory computer-readable medium; and
program instructions stored on the non-transitory computer-readable medium and executable by at least one processor to:
receive an input signal corresponding to one or more touch interactions on a touch-based interface;

determine a pressure level of a given touch interaction at a given time;

detect a first touch interaction comprising a relative reduction in pressure level greater than a first threshold relative reduction;

responsive to detecting the first touch interaction, initiate a first operation based on a region of the touch-based interface that corresponds to the first touch interaction;

detect a second touch interaction comprising (i) an initial non-zero pressure level, followed by (ii) a relative increase in pressure level that starts at the initial non-zero pressure level and that is greater than a first threshold relative increase, followed by (iii) a relative reduction in pressure level greater than a second threshold relative reduction; and responsive to detecting the second touch interaction, initiate a second operation based on a region of the touch-based interface that corresponds to the second touch interaction.

2. The system of claim 1, wherein the relative increase in pressure level greater than the first threshold relative increase comprises a relative increase in the pressure level by at least a predetermined percentage.

3. The system of claim 1, wherein the relative reduction in pressure level greater than the second threshold relative reduction comprises a relative decrease in the pressure level by at least a predetermined percentage.

4. The system of claim 1, wherein the system further comprises a head-mounted display, wherein the head-mounted display comprises at least one lens element, and wherein a graphic display is integrated into the at least one lens element.

5. The system of claim 4, wherein the touch-based interface is attached to the head-mounted display.

6. The system of claim 5, wherein the head-mounted display further comprises at least one extending side-arm, and wherein the touch-based interface is attached to one of the at least one extending side-arm.

7. A computer-implemented method comprising:

detecting on a touch-based interface, a touch interaction comprising (i) an initial non-zero pressure level, followed by (ii) a relative increase in pressure level that starts at the initial non-zero pressure level and that is greater than a threshold relative increase, followed by (iii) a relative reduction in pressure level greater than a first threshold relative reduction; and responsive to detecting the touch interaction, initiating an operation that (i) is associated with the touch interaction and (ii) is based on a region of the touch-based interface that corresponds to the touch interaction.

8. The method of claim 7, further comprising:

detecting another touch interaction on the touch-based interface, wherein the other touch interaction is a tap interaction comprising a relative reduction in pressure level greater than a second threshold relative reduction; and responsive to detecting the tap interaction, initiating an operation that (i) is associated with the tap interaction and (ii) is based on a region of the touch-based interface that corresponds to the tap interaction.

9. The method of claim 7, wherein the relative increase in pressure level greater than the threshold relative increase comprises a relative increase in the pressure level by at least a predetermined percentage.

10. The method of claim 7, wherein the relative reduction in pressure level greater than the first threshold relative reduction comprises a relative decrease in the pressure level by at least a predetermined percentage.

11. The method of claim 7, wherein the touch-based interface is attached to a head-mounted display.

12. The method of claim 11, wherein the head-mounted display comprises at least one lens element, and wherein a graphic display is integrated into the at least one lens element.

13. The method of claim 11, wherein the head-mounted display comprises at least one extending side-arm, and wherein the touch-based interface is attached to one of the at least one extending side-arm.

* * * * *